US009357055B2

(12) United States Patent  
Bahn et al.

(10) Patent No.: US 9,357,055 B2  
(45) Date of Patent: May 31, 2016

(54) MOBILE TERMINAL AND METHOD OF CONTROLLING A GROUP OPERATION THEREIN

(75) Inventors: Youngmi Bahn, Seoul (KR); Hyekyoung Song, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 518 days.

(21) Appl. No.: 13/112,992

(22) Filed: May 20, 2011

(65) Prior Publication Data

US 2011/0320977 A1 Dec. 29, 2011

(30) Foreign Application Priority Data

Jun. 24, 2010 (KR) .................. 10-2010-0059929

(51) Int. Cl.

| G06F 9/46 | (2006.01) |
|---|---|
| G06F 3/048 | (2013.01) |
| H04M 1/725 | (2006.01) |
| G06F 3/0481 | (2013.01) |
| G06F 3/0488 | (2013.01) |
| G06F 9/44 | (2006.01) |

(52) U.S. Cl.

CPC ......... *H04M 1/72583* (2013.01); *G06F 3/0481* (2013.01); *G06F 3/0488* (2013.01); *G06F 9/4443* (2013.01); *H04M 1/72586* (2013.01); *H04M 2250/10* (2013.01); *H04M 2250/22* (2013.01)

(58) Field of Classification Search

USPC ........................................................ 715/810

See application file for complete search history.

(56) References Cited

U.S. PATENT DOCUMENTS

| 8,856,680 B2 * | 10/2014 | Jung | .................... G06F 9/4443 715/718 |
|---|---|---|---|
| 8,863,026 B2 * | 10/2014 | Yamada | ................ G06F 3/0481 715/781 |
| 2002/0160817 A1 | 10/2002 | Salmimaa et al. | |

(Continued)

FOREIGN PATENT DOCUMENTS

| CN | 1818868 | 8/2006 |
|---|---|---|
| EP | 0816999 | 1/1998 |

(Continued)

OTHER PUBLICATIONS

Shelley O'Hara et al., "Absolute Beginner's Guide to Microsoft Windows Vista," Dec. 2006, pp. 45, 50, 56, and 221-225.*

(Continued)

*Primary Examiner* — Matt Kim  
*Assistant Examiner* — Mahelet Shiberou  
(74) *Attorney, Agent, or Firm* — Lee, Hong, Degerman, Kang & Waimey; Jonathan Kang; Harry Lee

(57) ABSTRACT

A mobile terminal and method of controlling a group operation therein are disclosed, by which tasks can be controlled with ease in a manner of designating one or more tasks to a task group in case of performing the one or more tasks simultaneously. The present invention includes a memory storing a task group including one or more tasks and a controller executing the one or more tasks belonging to the task group by a task group operation. And, the one or more tasks belonging to the task group are set to be correlated to each other. Moreover, if the one or more tasks belonging to the task group are executed by the task group operation, the controller simultaneously controls the one or more tasks by a single control operation.

20 Claims, 22 Drawing Sheets

(56) References Cited

U.S. PATENT DOCUMENTS

| | | | |
|---|---|---|---|
| 2004/0193621 A1* | 9/2004 | Moore | G06F 17/30126 |
| 2006/0112354 A1* | 5/2006 | Park | G06F 3/0481 |
| | | | 715/835 |
| 2006/0166678 A1* | 7/2006 | Karaoguz et al. | 455/456.1 |
| 2007/0157097 A1* | 7/2007 | Peters | G06F 3/04817 |
| | | | 715/764 |
| 2009/0031253 A1 | 1/2009 | Lee et al. | |
| 2009/0217198 A1* | 8/2009 | Jung | C06F 9/4443 |
| | | | 715/802 |
| 2010/0011304 A1* | 1/2010 | van Os | G06F 3/04817 |
| | | | 715/762 |

FOREIGN PATENT DOCUMENTS

| | | | | |
|---|---|---|---|---|
| EP | 1818840 | | 8/2007 | |
| EP | 2293533 | | 3/2011 | |
| KR | 10-2006-0056027 | | 5/2006 | |
| WO | WO2009087891 | * | 7/2009 | G06F 3/048 |

OTHER PUBLICATIONS

WO2009087891 ProQuest Document, publication date Jul. 16, 2009, Yamada et al.*

Apple-iPhone 4—Organize all your apps into folders, Jun. 10, 2010, XP55008825, Retrieved from the Internet: URL:http://web.archive.org/web/20100610231659/http://www.apple.com/iphone/features/folders.html.

"How to: Multi-tasking in iOS4", Jun. 22, 2010, XP55009007, Retrieved from the Internet: URL:http://ismashphone.com/2010/06/how-to-multitasking-in-ios4.html.

Apple, "Folders a new way to organize your apps", Jun. 2010, 2 pages.

KTBaxter, "How to: Multi-tasking in iOS4", Jun. 2010, 2 pages.

* cited by examiner (a)  (b)

(c)  (d)

(a)

(b)

(c)

(a)

(b)

(c)

(d)

(a)    (b)

(c)

(a)            (b)

(a)  (b)

(c)  (d)

(b)　　　　　　　　　　(b)

(c)

MOBILE TERMINAL AND METHOD OF CONTROLLING A GROUP OPERATION THEREIN

CROSS-REFERENCE TO RELATED APPLICATIONS

Pursuant to 35 U.S.C. §119(a), this application claims the benefit of earlier filing date and right of priority to Korean Application No. 10-2010-0059929, filed on Jun. 24, 2010, the contents of which is hereby incorporated by reference herein in its entirety.

BACKGROUND OF THE INVENTION

1. Field of the Invention

The present invention relates to a mobile terminal, and more particularly, to a mobile terminal and method of controlling a group operation therein. Although the present invention is suitable for a wide scope of applications, it is particularly suitable for controlling a plurality of tasks by a task group operation simultaneously.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, a terminal is able to perform various tasks including a call function, a message function, an MP3 play function and the like. However, in order to simultaneously perform various kinds of tasks, each of the tasks should be individually controlled.

SUMMARY OF THE INVENTION

Accordingly, the present invention is directed to a mobile terminal and method of controlling a group operation therein that substantially obviate one or more problems due to limitations and disadvantages of the related art.

An object of the present invention is to provide a mobile terminal and method of controlling a group operation therein, by which tasks can be controlled with ease in a manner of designating at least one or more tasks to a task group in case of performing the at least one or more tasks simultaneously.

Another object of the present invention is to provide a mobile terminal and method of controlling a group operation therein, by which tasks designated to a task group can be controlled in aspect of a group by performing a task group operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory storing a task group including at least one or more tasks and a controller executing the at least one or more tasks belonging to the task group by a task group operation. In this case, the at least one or more tasks belonging to the task group are set to be correlated to each other. And, if the at least one or more tasks belonging to the task group are executed, the task group operation simultaneously controls the at least one or more tasks by a single control operation by the controller.

Preferably, the task group operation includes at least one selected from the group consisting of a simultaneous background operation, a simultaneous foreground operation, a simultaneous storage operation and a simultaneous termination operation.

Preferably, if executing a first task belonging to the task group, the controller determines whether to execute a second task belonging to the task group.

Preferably, if executing a first task belonging to the task group, the controller provides a switching function of switching the first task to a second task belonging to the task group.

Preferably, if executing the at least one or more tasks belonging to the task group by the task group operation, the controller excludes a specific one of the at least one or more tasks belonging to the task group from the task group operation.

Preferably, if executing a specific task, the controller provides a list of at least one task group to which the specific task belongs.

Preferably, the controller sets the task to the task group in accordance with at least one selected from the group consisting of a function of the task, a user's use pattern of the task and a user's priority of the task. Moreover, the controller is able to set the tasks suitable for a specific place to a specific place task group.

Preferably, the mobile terminal further includes a user input unit configured to receive a selection of a task to be set to the task group. If receiving a selection of a specific task via the user input unit, the controller sets the specific task to the task group.

Preferably, the mobile terminal further includes a display unit configured to display the task group. The display unit is ale to display the task group in a manner of representing the task group as an icon. And, the display unit is able to display an indicator indicating a presence or non-presence of an execution of each of the tasks belonging to the task group.

In another aspect of the present invention, a method of controlling a group operation includes the steps of setting at least one or more tasks to a task group, storing the task group, and executing the at least one or more tasks belonging to the task group by a task group operation. In this case, the at least one or more tasks belonging to the task group are set to be correlated to each other. And, if the at least one or more tasks belonging to the task group are executed, the task group operation simultaneously controls the at least one or more tasks by a single control operation by the controller.

Preferably, the setting step includes the step of if receiving a selection of a specific task, setting up the task group in accordance with the selection.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
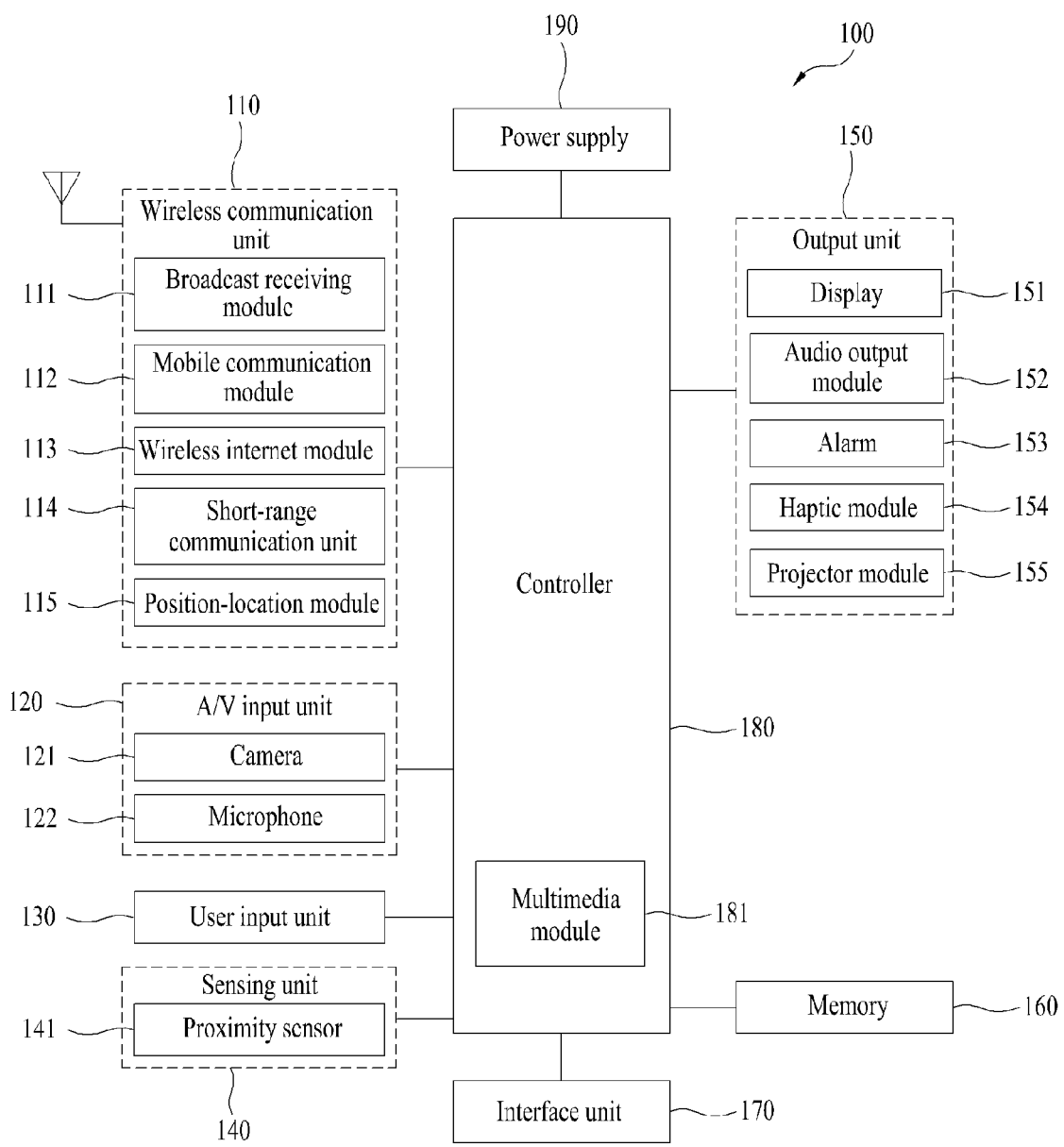
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

For clarity and convenience of the following description, assume that the mobile terminal mentioned in the following includes at least one of the components shown in FIG. 1.

Figure 2:
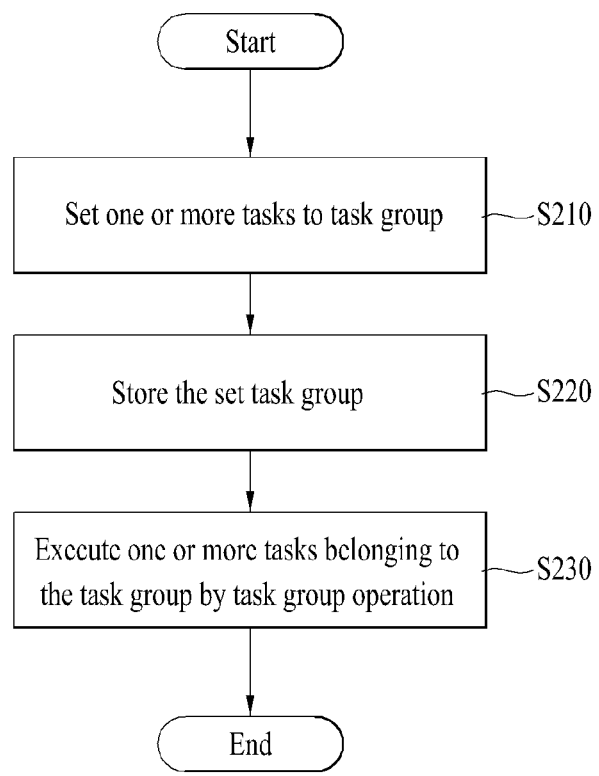
FIG. 2 is a flowchart for a group operation controlling method according to the present invention.

FIG. 2 is a flowchart for a group operation controlling method according to the present invention.

Referring to FIG. 2, the controller 180 sets at least one or more tasks to a task group [S210]. And, the memory 160 stores the corresponding task group [S220]. Subsequently, the controller 180 performs a task group operation on the at least one or more tasks belonging to the task group [S230].

A process for setting up a task group, storing the task group and performing a task group operation according to the present invention is described with reference to the accompanying drawings as follows.

In the present specification, a terminology 'task' means one of various kinds of operations or functions executable in the mobile terminal 100. Thus, the mobile terminal 100 can be equipped with various kinds of tasks. For instance, the mobile terminal 100 can be equipped with such a specific program as a call function, a DMB (digital multimedia broadcasting) function, an internet access function, a memo function, a message function, an MP3 player function, a VOD function and the like. The mobile terminal 100 is able to set a task by a file unit corresponding to a program as well as a program or an application. For instance, a specific word file in a specific word program can be included as a task.

In the present specification, a terminology 'task group' means a group that contains at least one or more tasks. A mobile terminal 100 according to the present invention is able to include various kinds of task groups. In particular, such a task group is set by a user or a manufacturer and can be then stored. For instance, an MP3 player function, a VOD function and an album function are set or designated to a multimedia task group and can be then stored.

Each task can be stored in a plurality of task groups as well. For instance, when there are first to fourth tasks, the first to third tasks are set to a first task group and the first, second and fourth tasks can be set to a second task group as well. In particular, the first and second task can be stored in a manner of being set or designated to a plurality of task groups.

On the contrary, each task may not belong to any one of the task groups. In this case, as mentioned in the foregoing description, when a plurality of tasks are performed by a multitasking operation, it is determined whether to set them to a task group. If the corresponding tasks are set to the task group, it is able to store the corresponding task group in the memory 160. Yet, the tasks are just set to the task group by the multitasking operation performed once and the corresponding task group may not be stored.

In the present specification, a terminology 'task group operation' means an operation for controlling a plurality of tasks belonging to a task group. The task group operation can include an operation for controlling a plurality of tasks belonging to a task group simultaneously by a signal control action. And, a plurality of tasks belonging to a task group can be set up to be closely correlated to each other.

In the following description, an operation for setting up a task group is explained with reference to FIGS. 3 to 6.

Figure 3:
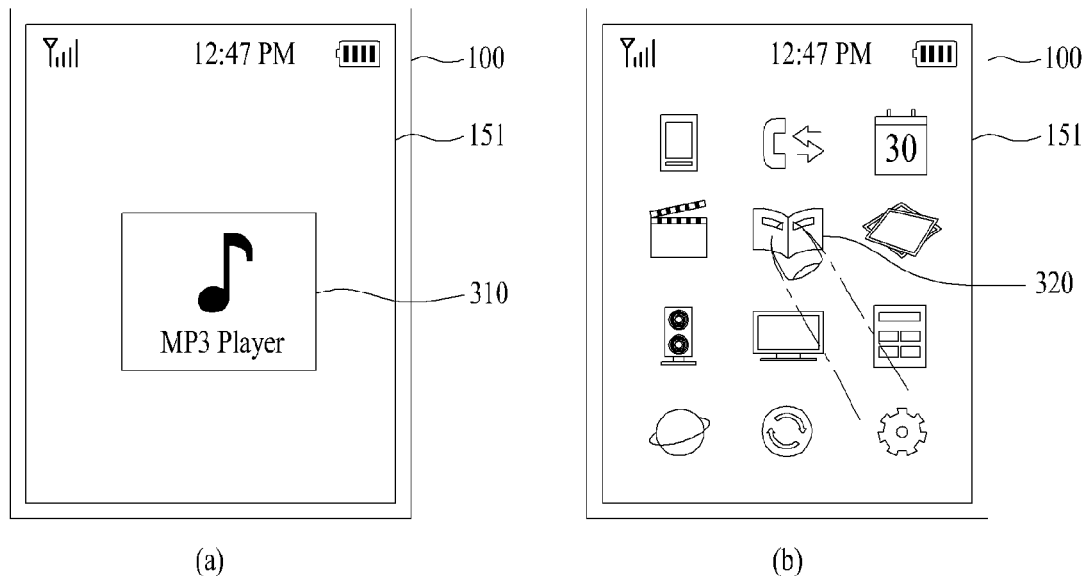
FIG. 3 is a diagram for a first example of an operation for setting up a task group according to the present invention.
Figure 3:
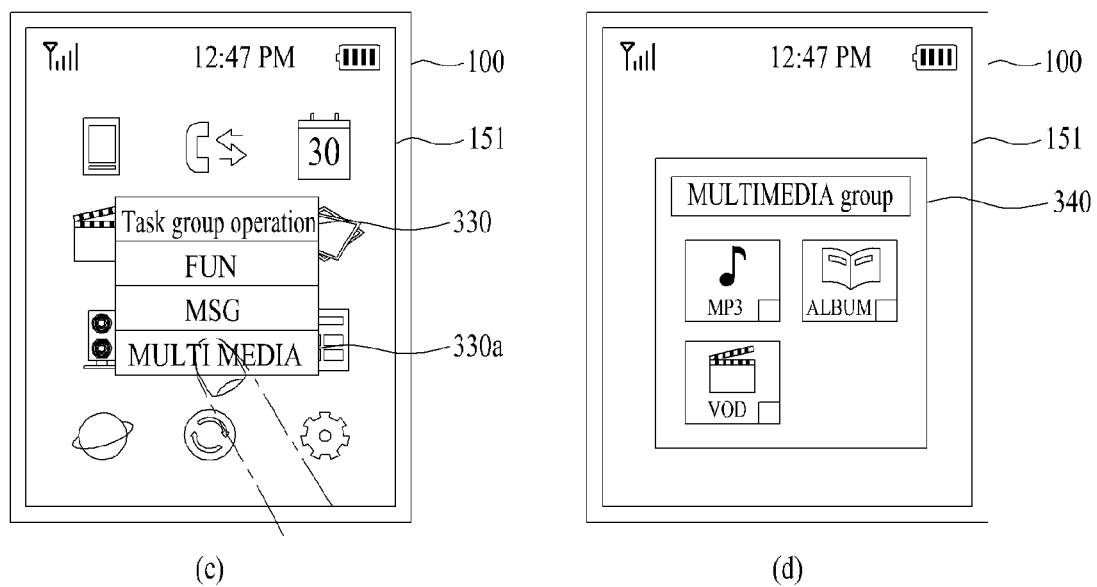

FIG. 3 is a diagram for a first example of an operation for setting up a task group according to the present invention.

Referring to FIG. 3, regarding a task group setting, in case that a multitasking operation is performed in a manner of executing a different task additionally in the course of executing a specific task, the corresponding tasks can be set to a task group.

FIG. 3 (*a*) is a diagram for displaying an executed specific task on a display unit 151. FIG. 3 (*a*) shows that an MP3 player function is executed as a specific task.

FIG. 3 (*b*) is a diagram of an operation for executing a different task in the course of executing an MP3 player function as a task. FIG. 3 (*b*) shows an operation for performing a multitasking job by executing an album function as a different task in the course of executing an MP3 player function.

FIG. 3 (*c*) is a diagram for a case of setting an MP3 player task and an album task to a task group.

Referring to FIG. 3 (*c*), it is able to receive a selection for determining whether to set up a task group from a user. In case that a plurality of tasks are stored as a same task group in the memory 160, a corresponding task group name and a menu for a selection for determining whether to execute a task group operation are displayed on the display unit 151. Subsequently, the selection for the stored specific task group is made and a corresponding task group can be set up.

In the drawing, since an album task is executed in the course of executing an MP3 player task, a selection menu 330 for selecting a task group is displayed.

FIG. 3 (*d*) is a diagram for displaying tasks of a task group in case of receiving a selection for the execution of the task group.

Referring to FIG. 3 (*d*), a first task (i.e., MP3 player task) and a second task (i.e., album task) are included in a multimedia task group. And, a VOD task can be further included in the multimedia task group. In accordance with a selection made by a user, since the user may attempt to execute the VOD task (i.e., a third task) by a task group operation together with the first and second tasks, the user additionally selects the third task and is then execute the third task by the task group action.

Thus, in case of attempting to perform a multitasking in a manner of executing a different task in the course of performing a prescribed task, the corresponding tasks are set to a task group and can be then executed by a task group operation.

Figure 4:
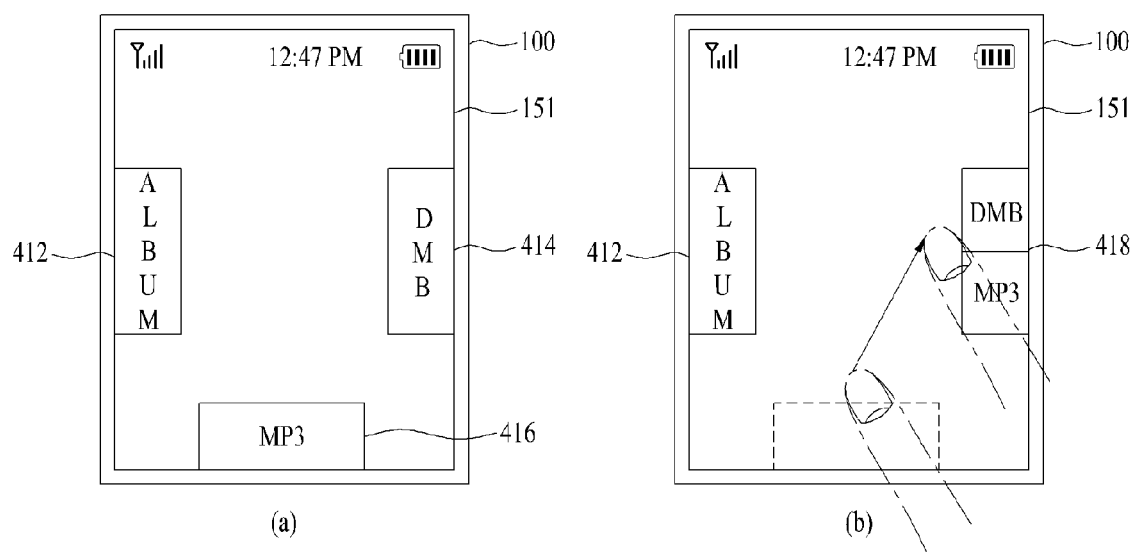
FIG. 4 is a diagram for a second example of an operation for setting up a task group according to the present invention.
Figure 4:
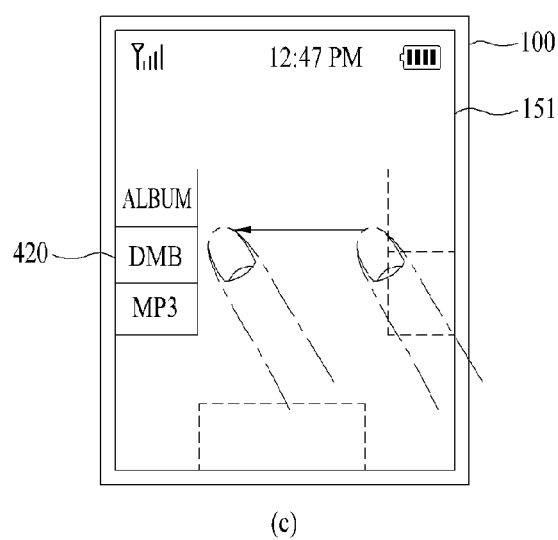

FIG. 4 is a diagram for a second example of an operation for setting up a task group according to the present invention.

First of all, since a display unit of the present invention is equipped with a function of a touchscreen, each task is touched and can be then set to a task group.

Referring to FIG. 4 (a), an album task 412, a DMB task 414 and an MP3 player task 416 are displayed on the display unit 151.

Referring to FIG. 4 (b), the MP3 player task 416 is shifted to the DMB task 414 through a touch action, whereby both of the MP3 player task 416 and the DMB task 414 are integrated together. As the both of the tasks 416 and 414 are integrated together, a new task group 418 is displayed on the display unit 151. The controller 180 is able to perform a task group operation by recognizing the DMB task and the MP3 player task as a task group in accordance with such a touch action.

Referring to FIG. 4 (c), the task group 418 generated from integrating the MP3 player task 416 and the DMB task 414 together is shifted to the previous album task 412 via a touch action to set up a new task group 420. The controller 180 is able to set the DMB task, the MP3 player task and the album task to another new task group 420 in accordance with such a touch action.

Figure 5:
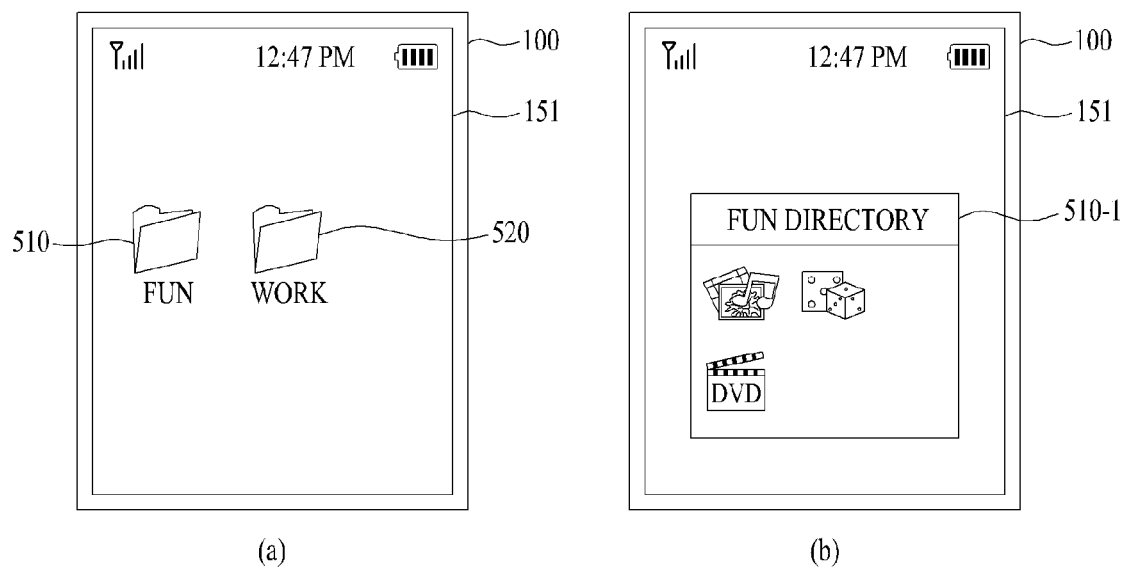
FIG. 5 is a diagram for a third example of an operation for setting up a task group according to the present invention.
Figure 5:
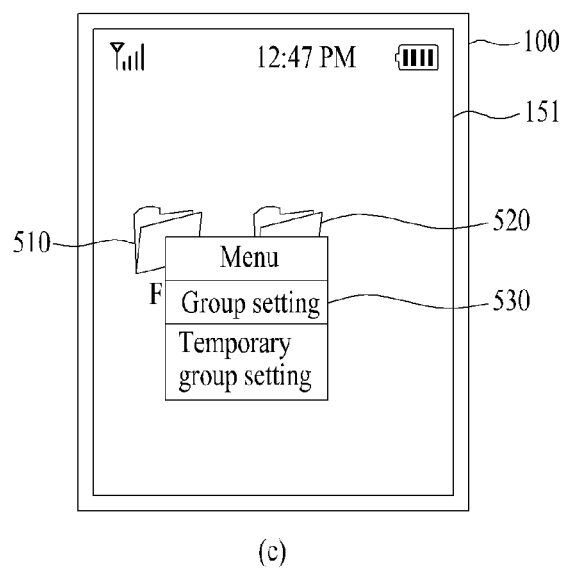

FIG. 5 is a diagram for a third example of an operation for setting up a task group according to the present invention.

Referring to FIG. 5, it is able to utilize a previously set directory by a different method of setting up a task group including at least one or more tasks. The mobile terminal 100 is able to have various kinds of directories in accordance with various references. For instance, the mobile terminal 100 is able to have a directory including programs or applications and a directory including files. These directories just play roles in classifying programs, applications and files.

According to the present invention, the controller 180 is able to set the previously existing directories to a task group. Once the directory is set to the task group of the present invention, a function of executing the tasks included in the corresponding task group by a task group operation is provided as well as a function of storing or including the tasks only. Therefore, the tasks (e.g., applications, programs, files, etc.) belong to the previous directory are set to a task group to be executed by the task group operation.

FIG. 5 (a) is a diagram of two directories.

Referring to FIG. 5 (a), a directory 'FUN' 510 and a directory 'WORK' 520 are displayed the previously existing directories on the display unit 151.

FIG. 5 (b) is a detailed diagram of the FUN directory 510 of the two directories.

Referring to FIG. 5 (b), if the FUN directory 510 is selected, a plurality of tasks of the corresponding directory can be displayed in detail.

FIG. 5 (c) is a diagram of an operation for setting a previous directory to a task group.

Referring to FIG. 5 (c), it is able to query whether the previously existing directories 510 and 520 shown in FIG. 5 (a) will be set to a task group. In particular, it is able to query whether the directories 510 and 520 will be stored as a task group or a temporary task group, via a select menu 530. If the directories 510 and 520 are set to the task group through the above queries, the tasks corresponding to the previous directories 510 and 520 belong to the task group and can be then executed by a task group operation.

Figure 6:
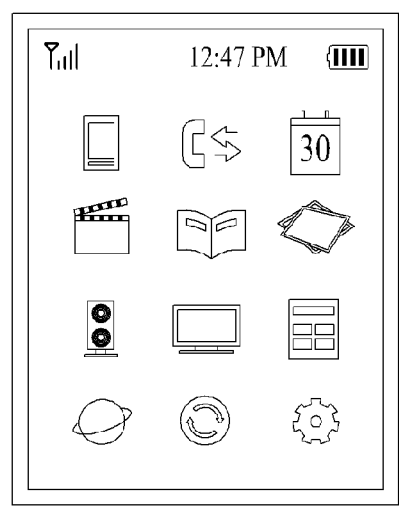
FIG. 6 is a diagram for a fourth example of an operation for setting up a task group according to the present invention.
Figure 6:
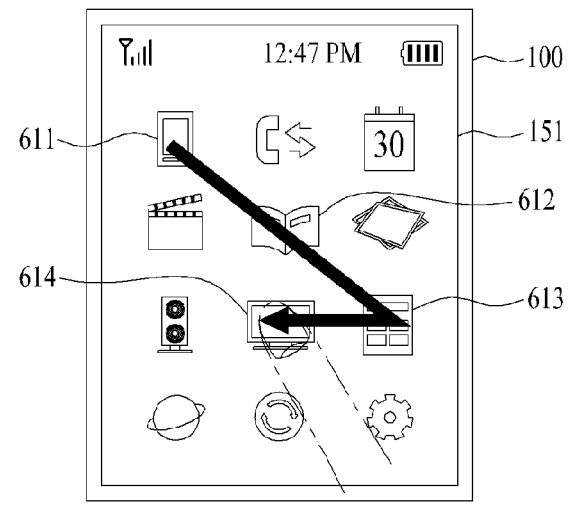
Figure 6:
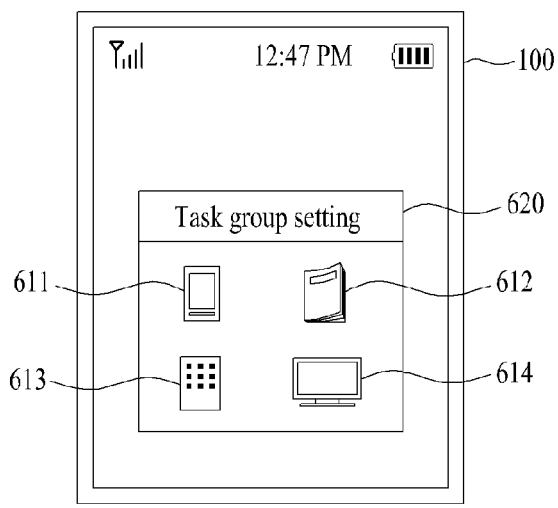

FIG. 6 is a diagram for a fourth example of an operation for setting up a task group according to the present invention.

Referring to FIG. 6, the display unit 151 of the present invention can be equipped with a function of a touchscreen. The touchscreen 151 receives an input of a touch & drag action from a user and is then able to set a plurality of tasks respectively corresponding to a plurality of icons to a task group in accordance with the received touch & drag action.

FIG. 6 (a) is a diagram for displaying various kinds of icons on the touchscreen 151. Referring to FIG. 6 (a), each of the icons indicates an application or program that represents a specific task.

FIG. 6 (b) shows that a specific touch & drag action is inputted to the touchscreen 151 by a user.

Referring to FIG. 6 (b), the touchscreen 151 recognizes that the icons 611 to 614 situated on the trace of the touch & drag are selected.

The controller 180 identifies the tasks respectively corresponding to the selected icons 611 to 614 and is then able to set up a task group constructed with the corresponding tasks.

FIG. 6 (c) is a diagram of a task group constructed with the tasks selected in accordance with the touch & drag action.

Referring to FIG. 6 (c), the controller 180 sets up a task group constructed with the tasks corresponding to the icons situated on the trace of the touch & drag and is then able to control the corresponding task group to be displayed on the touchscreen 151.

Figure 7A:
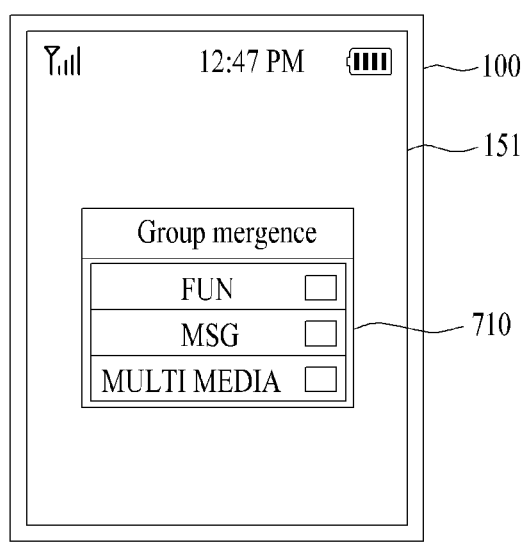
FIG. 7A and FIG. 7B are diagrams of an operation for combining task groups according to the present invention.
Figure 7B:
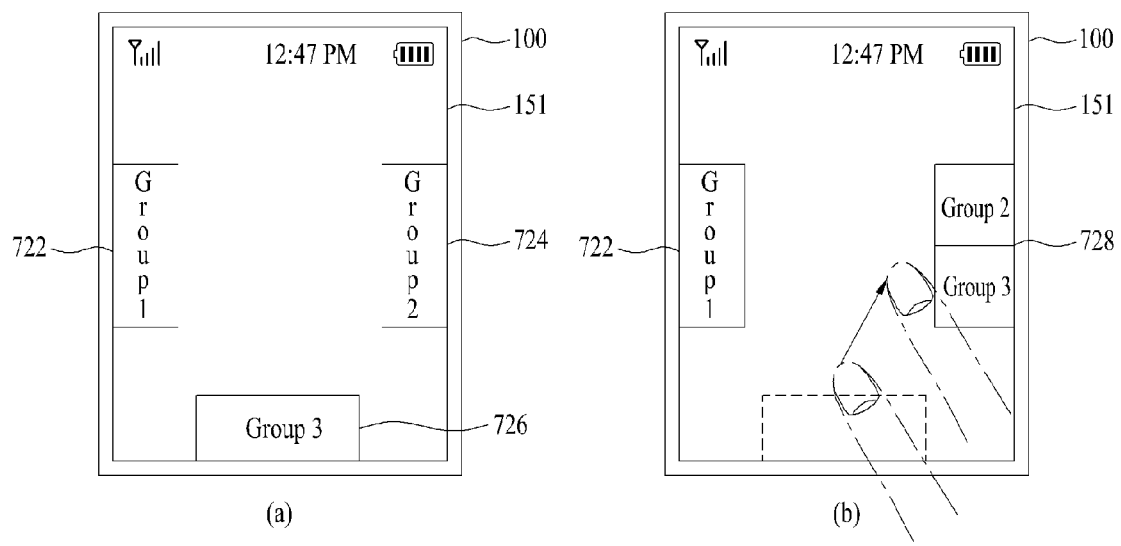
Figure 7B:
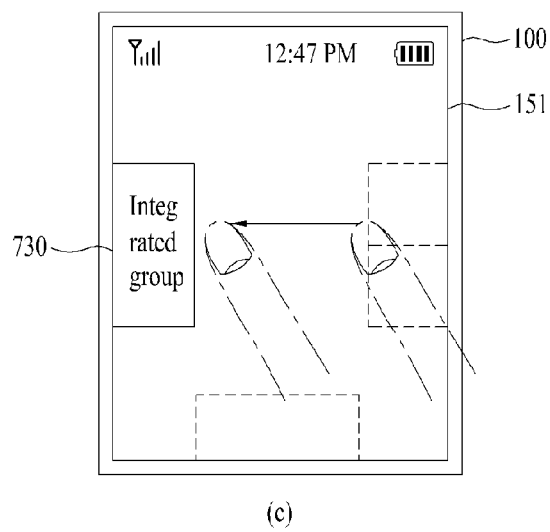

FIG. 7A and FIG. 7B are diagrams of an operation for combining task groups according to the present invention.

In particular, FIG. 7A is a diagram for a scheme of setting up a new task group by integrating task groups together.

Referring to FIG. 7A, a select menu 710 for group mergence is displayed. It is able to set up a new task group in a manner of integrating previous task groups together. In this case, it is able to select specific groups, which are to be integrated together, from the previous task groups. Although the drawing shows the task groups named MSG, FUN and MULTIMEDIA, all the task groups stored in the memory 160 of the mobile terminal 100 can be displayed for the integration.

FIG. 7B is a diagram for another scheme of setting up a new task group by integrating a plurality of previous groups.

Referring to FIG. 7B (a), task groups 722, 724 and 72 are displayed on the display unit 151.

Referring to FIG. 7B (b), the groups are integrated together in a manner that the group 3 726 is shifted to the previous group 2 724 via a touch action. Subsequently, as both of the groups 726 and 724 are integrated together, a new task group 728 is displayed on the touchscreen 151. The controller 180 recognizes the integrated groups as a single task group and then performs a task group operation, in accordance with the touch action.

Referring to FIG. 7B (c), the task group 728 generated from integrating the group 2 and the group 3 together is shifted to the previous group 722 via a touch action and is then set to a new task group 730. The controller 180 recognizes the group 1, the group 2 and the group 3 as a new task group in accordance with the touch action and then performs a task group operation on the tasks belonging to the corresponding task groups.

Figure 8:
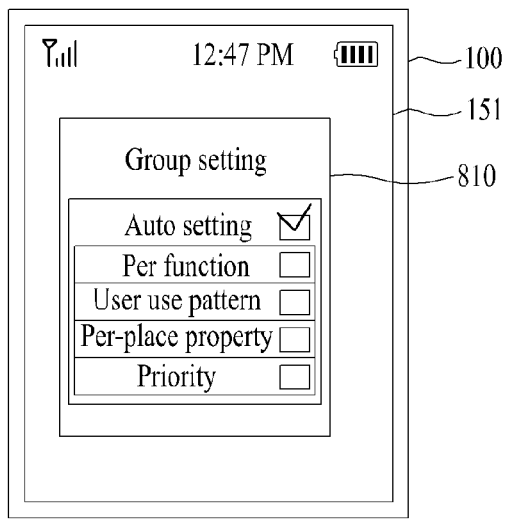
FIG. 8 is a diagram for an operation for setting up a task group automatically according to the present invention.
Figure 8:
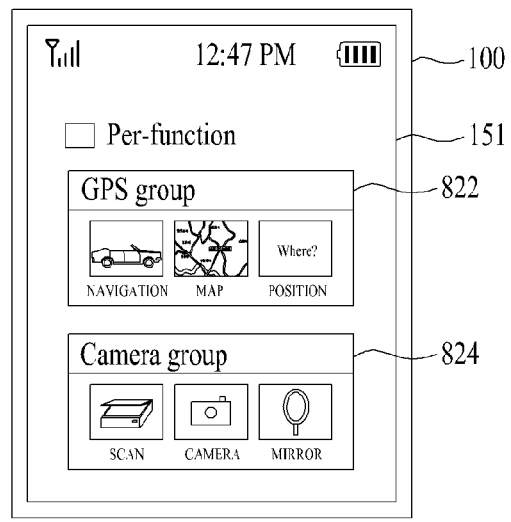
Figure 8:
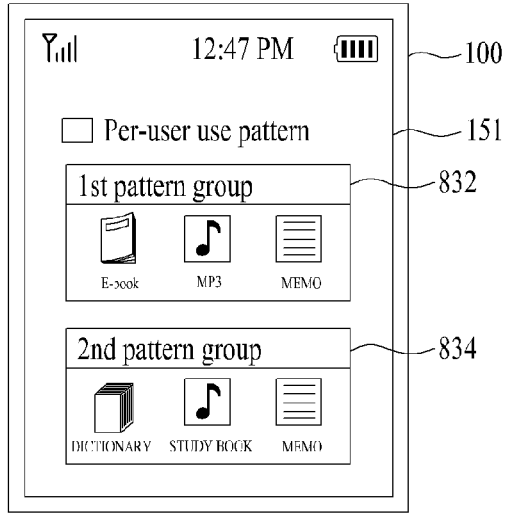
Figure 8:
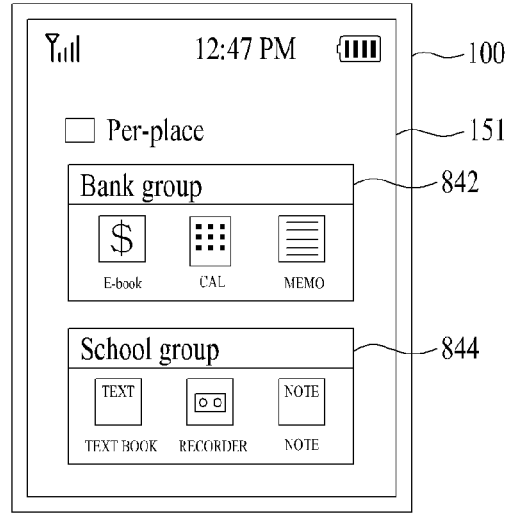

FIG. 8 is a diagram for an operation for setting up a task group automatically according to the present invention.

First of all, it is able to set up a task group by various ways schemes. Particularly, the schemes can mainly include a scheme of setting up a task group automatically and a scheme of setting up a task group in accordance with a selection made by a user.

According to the former descriptions with reference to FIGS. 3 to 6, a scheme of setting up a task group in accordance with a selection made by user is explained. On the contrary, a scheme of setting up a task group automatically is described with reference to FIG. 8 as follows.

First of all, the schemes of setting up a task group automatically can be classified into a selection scheme according to a reference of a manufacturer, a scheme of grouping orders having high frequency of use by a user, a scheme of groping tasks having high priority of user and the like. Alternatively, it is able to set up a task group in accordance with a function of a corresponding task. Alternatively, it is able to set up a task group in accordance with a past use pattern of user in using tasks. Alternatively, it is able to set up a task group with tasks associated with a specific place.

In case of setting up a task group, a user is able to randomly set up a task group in various ways instead of putting a restriction on a corresponding format. In particular, a user is able to set up a task group in such a manner as a temporary group setting, a selection of a different group in accordance with a place of a user, and the like.

FIG. 8 (a) shows a display in association with a task group setting. In particular, FIG. 8 (a) shows that an auto setting menu and a user setting menu are displayed.

Referring to FIG. 8 (a), exemplary selection references associated with the auto group setting are displayed on the display unit 151. A group setting menu 810 can include various kinds of setting references. For instance, it is able to set up a task group in accordance with one of a function, a user's use pattern, a property per place, a priority and the like.

FIG. 8 (b) is a diagram for setting a task group in accordance with a function.

Referring to FIG. 8 (b), tasks can be classified in various ways in accordance with functions. For instance, if a function of a task is to obtain a position using GPS capability, the task can be identified per similar task. If a function of a task is to obtain an external image using a camera, it can be identified per similar task.

In the drawing, a task group 822 classified into a GPS function and a task group 824 classified into a camera function are shown. Besides the corresponding task groups, tasks can be set to various task groups (e.g., a task group providing an internet function, a task group providing a haptic function, etc.) in accordance with functions.

FIG. 8 (c) is a diagram for setting a task group per user's use pattern.

Referring to FIG. 8 (c), various kinds of informations on previous task use patterns of a user are stored in the memory 160 of the mobile terminal 100. For instance, the various kinds of informations on a cumulative time of user's use of a specific task, a cumulative count of uses, a result from using a task and the like can be included.

Besides, the memory 160 is able to store a use pattern of a plurality of tasks used simultaneously by a user in the past. For instance, a user may use a memo application as a second task while using an e-book application as a first task. And, such a use pattern can be stored in the memory 160. Using such a user's use pattern of the tasks, the controller 180 is able to set up a task group per user use pattern.

In FIG. 8 (c), exemplarily shown are a first per-use pattern task group 832 and a second per-use pattern task group 834. In case of the first per-use pattern task group 832, an e-book task, an MP3 task and a memo task are set to a task group. In case of the second per-use pattern task group 832, a dictionary task, an MP3 task and a memo task are set to a task group.

In general, when a user of the mobile terminal 100 uses a specific task (e.g., an application, a program, etc.), the user has a pattern of using a different task associated with the specific task frequently. Therefore, when tasks are executed by a task group operation in a manner of analyzing the user's pattern and then setting up a task group with the corresponding tasks, a user is facilitated to manage the corresponding tasks without enabling the tasks to be located one by one.

FIG. 8 (d) is a diagram for setting up a task group per place.

Referring to FIG. 8 (d), in case of a specific task, there exist tasks sensitive to a specific place. For instance, if a specific place is a bank, such a specific task as a bank application is highly related to the back. For another instance, if a specific place is a school, such a specific task as an e-book application is highly related to the school.

Therefore, a plurality of specific tasks sensitive to a place or a location are grouped by a corresponding place and can be then set to a task group.

In FIG. 8 (d), a bank group 842 and a school group 844 are shown.

In order to configure the bank group 842 with tasks, a bank application, a calculator application and a memo application are included in the tasks. In order to configure the school group 844 with tasks, an e-book application, a voice recorder application and a note application are included in the tasks. In particular, the controller 180 is able to set up a task group with tasks, which are useful for a specific place, as the tasks associated with a specific place.

In case of setting up a task group by a specific place, as mentioned in the foregoing description with reference to FIG. 1, since the mobile terminal 1 100 according to the present invention includes the position location module 115 capable of obtaining a current position information, the mobile terminal 100 is able to obtain a current position and a current place. Therefore, the controller 180 is able to execute a per-place task group suitable for the currently obtained place.

Regarding the reference of the auto setting, the present invention is non-limited by the above described per-reference such as a function, a user use pattern, a place, a priority and the like. The present invention is able to freely set tasks to a task group though various references failing to be described in this disclosure.

Figure 9:
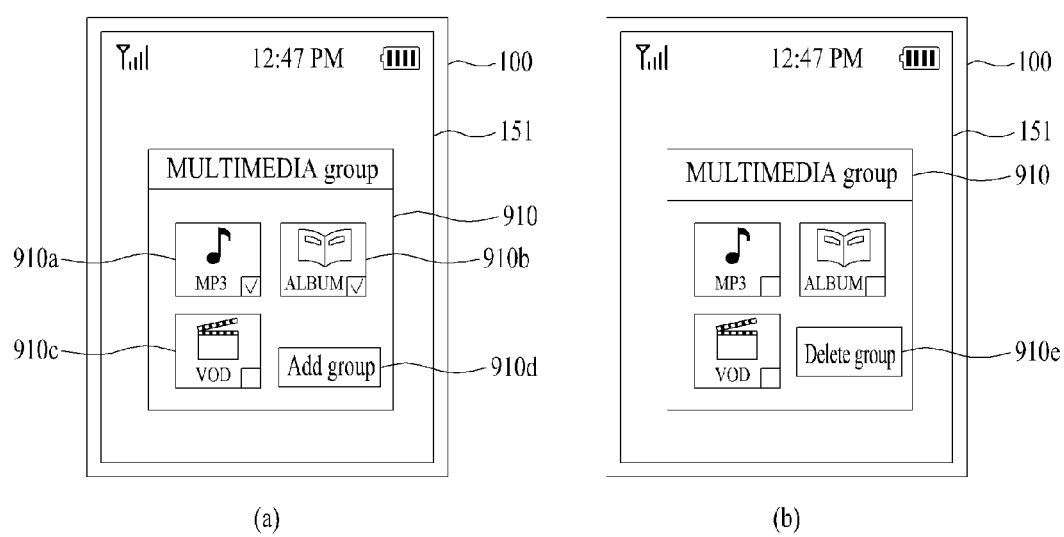
FIG. 9 is a diagram of a menu for adding a task belonging to a task group and a menu for deleting the task according to the present invention.

FIG. 9 is a diagram of a menu for adding a task belonging to a task group and a menu for deleting the task according to the present invention.

Referring to FIG. 9, in case that the controller 180 sets at least one or more tasks to a task group, a specific one of the tasks can be deleted from or added to the task group. Even if the tasks are set to the task group, it is unnecessary to execute all the tasks belonging to the task group by the same task group operation. Therefore, some of the tasks can be deleted from the task group if necessary.

On the other hand, even if the tasks do not belong to the task group, it is may be necessary to add a task, which does not belong to the corresponding task group, to the corresponding task group temporarily or permanently. Therefore, it is able to add the task, which does not belong to the corresponding task group, to the task group temporarily or permanently if necessary.

Referring to FIG. 9 (a), a group add menu 910d for an addition to a task group is displayed on the touchscreen 151.

Referring to FIG. 9 (b), a group delete menu 910e for a deletion from a task group is displayed on the touchscreen 151.

Optionally, both of the group add menu 910*d* and the group delete menu 910*e* can be displayed together.

Figure 10:
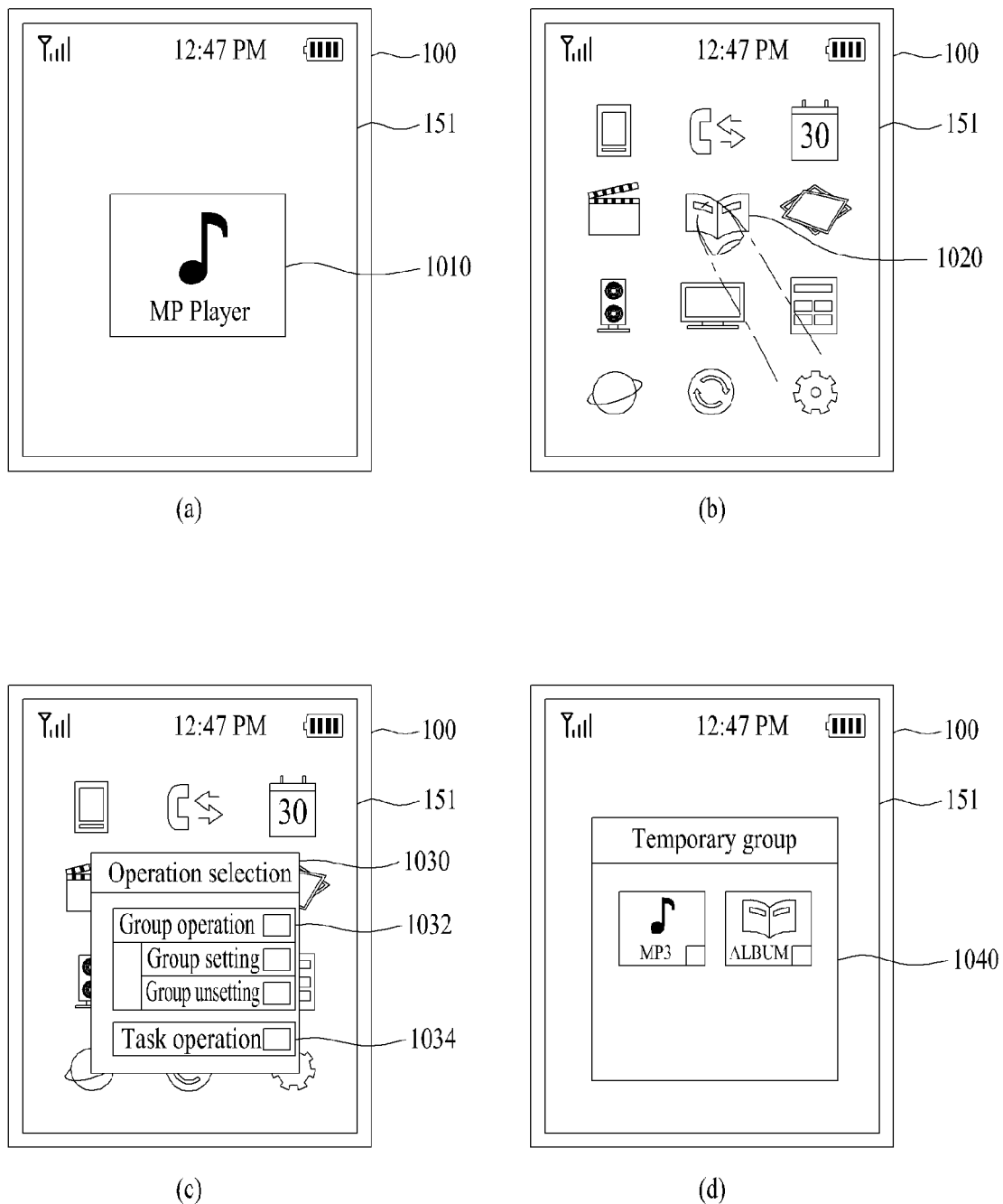
FIG. 10 is a diagram of an operation for setting up a temporary task group according to the present invention.

FIG. 10 is a diagram of an operation for setting up a temporary task group according to the present invention.

Referring to FIG. 10, in association with a task group setting and a task group operating, it is not mandatory to set up a task group and store the corresponding task group in the memory 160. For instance, a user may intend an overall control through a task group operation once only. In this case, the mobile terminal 100 is able to set tasks to a temporary task group for once only.

FIG. 10 (*a*) is a diagram for displaying an execution of a specific task on the display unit 151.

Referring to FIG. 10 (*a*), an MP3 player function is executed as a specific task.

FIG. 10 (*b*) is a diagram for an action for executing a second task while an MP3 player function is being executed as a first task.

Referring to FIG. 10 (*b*), while an MP3 player task function is being executed as a first task, an album task function is executed as a second task to perform a multitasking job.

FIG. 10 (*c*) is a diagram for displaying types of an operation if tasks do not belong to a task group.

Referring to FIG. 10 (*c*), an operation select menu 1030 is displayed on the display unit 151. In the operation select menu 1030, a menu for selecting a task group operation and a menu for selecting an individual task operation are displayed. As mentioned in the foregoing description, if a first task and a second task do not belong to a same task group in association with task group information stored in the memory, a user selects whether each task will be separately executed by a task operation or all tasks will be executed by a group operation.

If the task group operation is performed by selecting the group operation menu 1032, an additional select menu is proposed. In case of performing the corresponding task group operation, it is able to set the first task and the second task to a new task group. The new task group is stored in the memory 160 and can be used in the future in case of performing a multitasking operation of the first and second tasks.

On the contrary, there can exist a case that a task group operation is performed once only despite the execution by the task group operation. In particular, although a task group is set up temporarily, if a task group operation is terminated, it is not necessary to store the corresponding task group in the memory 160 separately.

Thus, in case of attempting to execute tasks failing to belong to a task group previously, the corresponding tasks are designated to a temporary group to be executed by a task group operation.

FIGS. 11A to 11D are diagrams for displaying a task group according to an embodiment of the present invention.

Figure 11A:
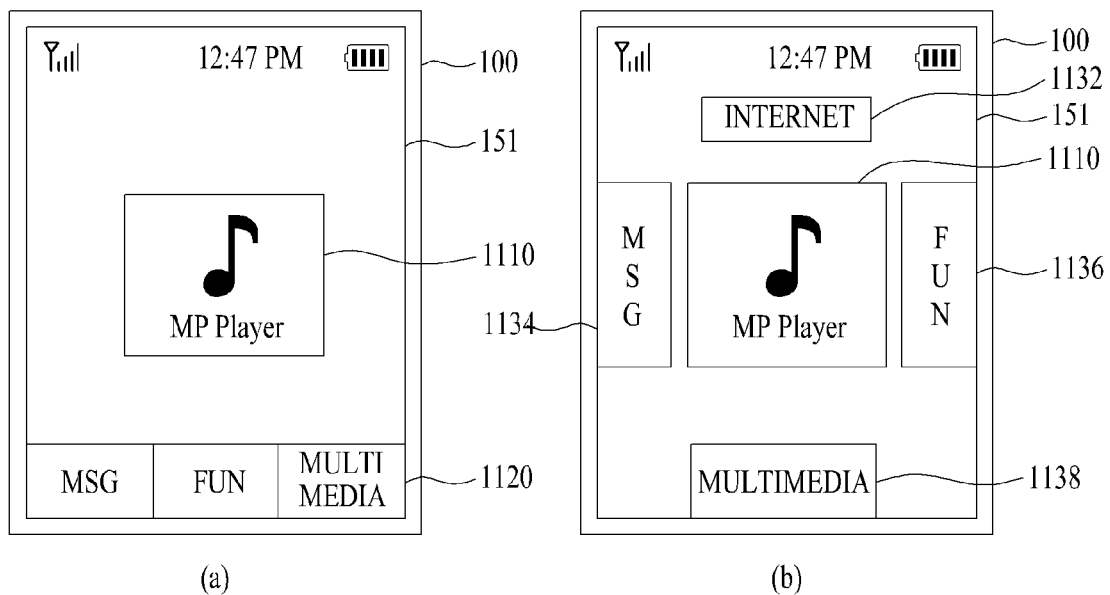
FIGS. 11A to 11D are diagrams for displaying a task group according to an embodiment of the present invention.
Figure 11A:
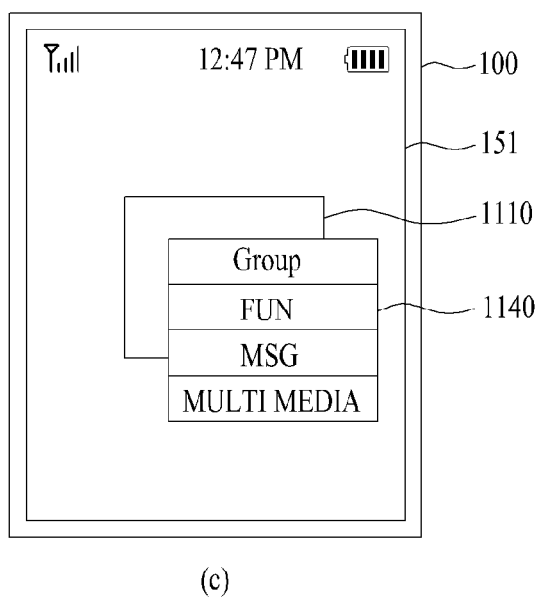

FIG. 11A is a diagram for displaying a plurality of task groups on a display unit according to the present invention.

Referring to FIG. 11A, while an MP3 player task is being executed as a first task, a plurality of task groups, to which the MP3 player task belongs, are displayed. Information on whether to set up each of the task groups is stored in the memory 160 in advance.

Referring to FIG. 11A (a), while an MP3 player task is being executed, if a task group operation is performed, MSG, FUN and MULTIMEDIA task groups including the MP3 player task are displayed on a bottom side of the display unit 151.

Referring to FIG. 11A (b), while an MP3 player task is being executed, if a task group operation is performed, INTERNET, MSG, FUN and MULTIMEDIA task groups 1132, 1134, 1136 and 1138 including the MP3 player task are displayed on top, left, right and bottom sides of the display unit, respectively.

FIG. 11A (c) is another diagram for displaying a plurality of task groups.

Referring to FIG. 11A (c), while an MP3 player task is being executed, if a task group operation is performed, an option menu 1140 is displayed in addition. Therefore, one of the task groups can be selected via the option menu 1140.

Figure 11B:
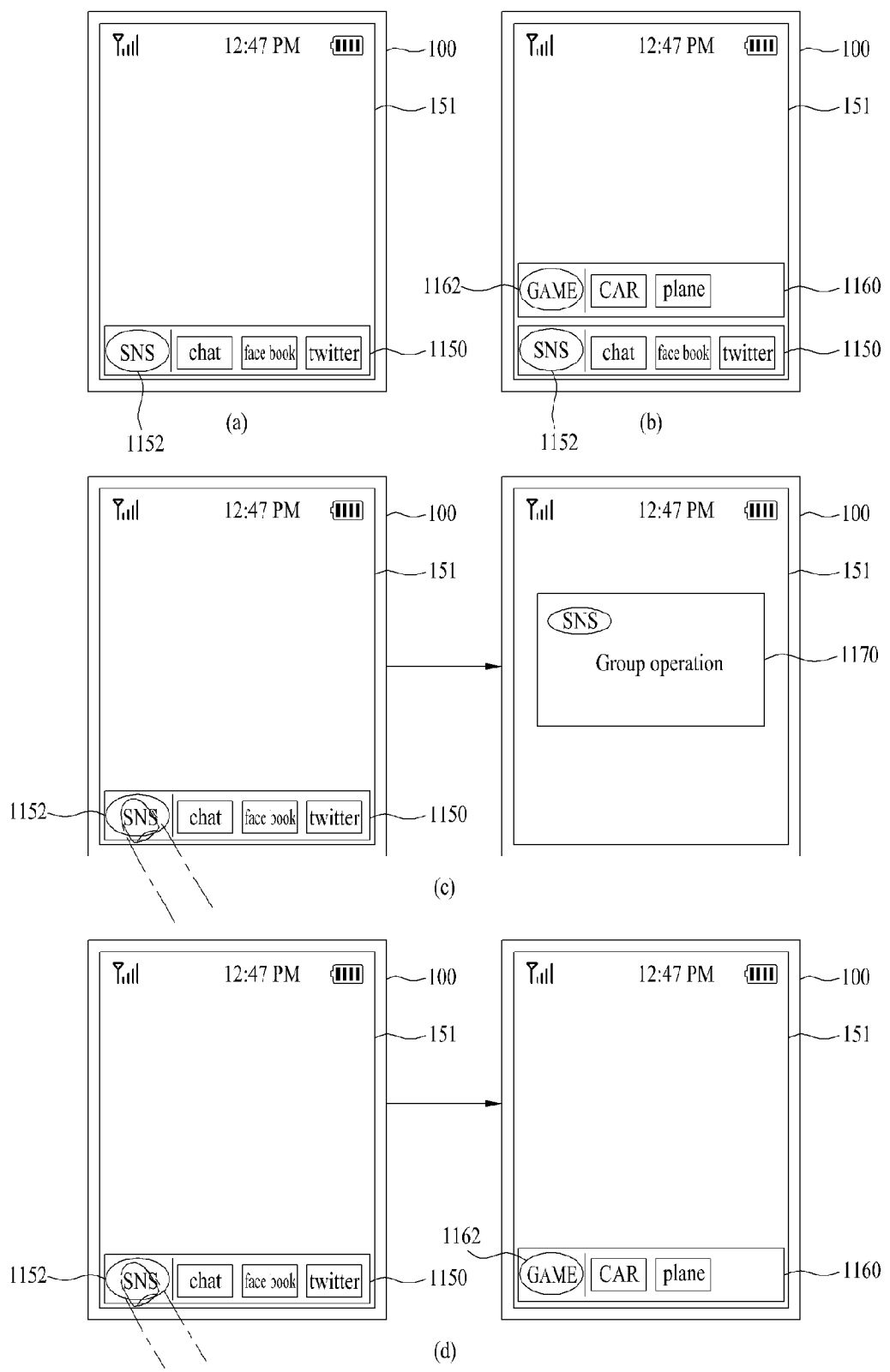

FIG. 11B is a diagram for displaying a representative icon of a task group.

Referring to FIG. 11B, when a task group is displayed, a representative icon representing the corresponding task group is generated and displayed.

Referring to FIG. 11B (a), an SNS task group 1150 is displayed on a bottom side of the display unit 151. In doing so, the SNS task group 1150 is represented as including tasks belonging to the SNS task group 1150. In this case, it is able to display a representative icon indicating the SNS task group as well as the task belonging to the SNS task group. Through this, a user is facilitated to identify the corresponding task group.

Referring to FIG. 11B (b), two task groups, i.e., a GAME task group 1160 and an SNS task group 1150 are displayed on the display unit 151. In doing so, the GAME task group 1160 is displayed as including a representative icon 1162 indicating the GAME task group 1160. And, the SNS task group 1150 is displayed as including a representative icon 1152 indicating the SNS task group 1150.

FIG. 11B (c) exemplarily shows one function of a representative icon.

Referring to FIG. 11B (c), a representative icon indicating a group task is able to perform a function of executing a task group operation as well as a function of displaying a corresponding group task.

If the representative icon 1152 of the SNS task group 1150 is selected, the controller 180 recognizes a group operation of the corresponding SNS task group and then executes the corresponding task group by a group operation.

FIG. 11B (d) exemplarily shows a different function of a representative icon.

A representative icon indicating a task group is able to provide various functions as well as a function of simply displaying the corresponding task group. For instance, if a representative icon is selected, it is able to provide a function of switching to a different task group.

Referring to FIG. 11B (d), if a representative icon 1152 indicating an SNS task group is selected, the controller 180 is able to control the representative icon to a different task group, i.e., a GAME task group 1160. In this case, a target of the switching can include a target displayed on the display unit 151 or a target of a task group operation. In particular, if a representative icon is selected, a different task group can be displayed. Moreover, the tasks belonging to a task group different from a task group indicated by the representative icon can be executed by a task group operation.

Figure 11C:
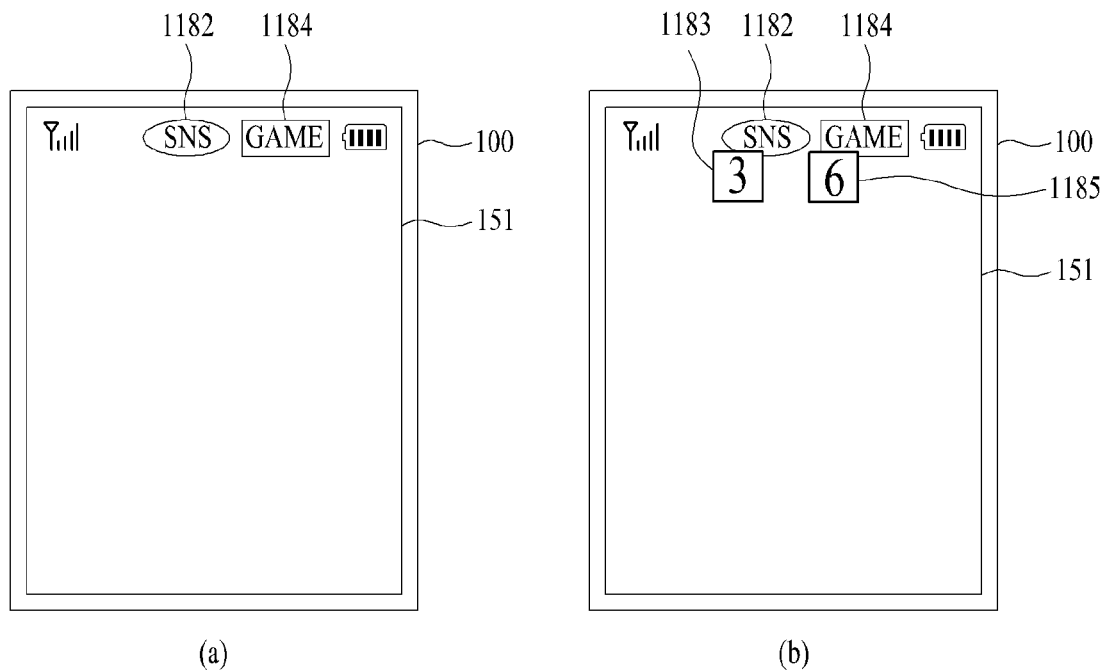
Figure 11C:
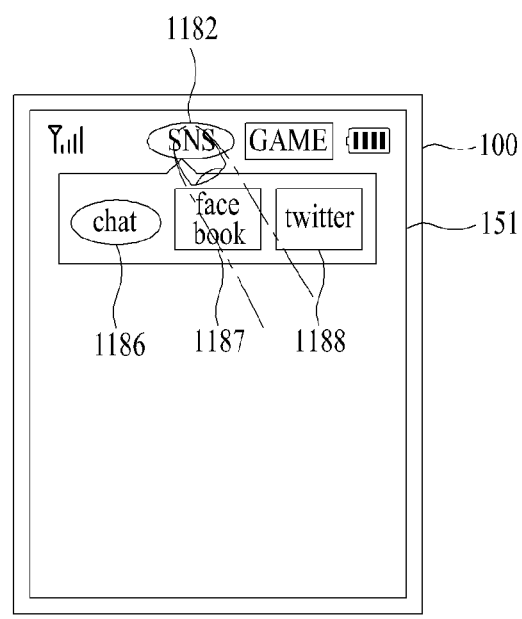

FIG. 11C is a diagram for displaying a task group in a manner of indicating the task group using an indicator.

Referring to FIG. 11, the mobile terminal 100 is able to announce a fact recognition of an existence of a task group or a group operation of a task group using an indicator.

Referring to FIG. 11C (a), indicators 1182 and 1184 respectively indicating specific task groups can be displayed on a top side of the display unit 151. Each of the indicators 1182 and 1184 for the corresponding task group is able to indicate the existence of the corresponding task group and is also able to indicate that that the corresponding task group is performing a task group operation. Through the indicator, a user is able to confirm a presence or non-presence of the task group operation as well as the existence of the corresponding task group.

Referring to FIG. 11C (b), the mobile terminal 100 is able to display different functions of the indicators 1182 and 1184. In this case, the indicator indicates a specific task group and is also able to indicate specific information of the corresponding task group. For instance, the indicator is able to display the number of tasks belonging to the corresponding task group. In FIG. 11C (b), the indicator 1182 indicating the SNS task group indicates the number of tasks belonging to the SNS task group via a display window 1183. And, the indicator 1184 indicating the GAME task group indicates the number of tasks belonging to the GAME task group via a display window 1185.

Referring to FIG. 11C (c), in case that an indicator of a task group is touched or selected (e.g., proximity touch, a task belonging to the corresponding task group is displayed.

The indicator is situated on the top side of the display unit 151 to indicate an existence of a task group, a presence or non-presence of a task group operation. If an additional user action exists, as shown in the drawing, tasks belonging to a corresponding task group can be displayed.

Figure 11D:
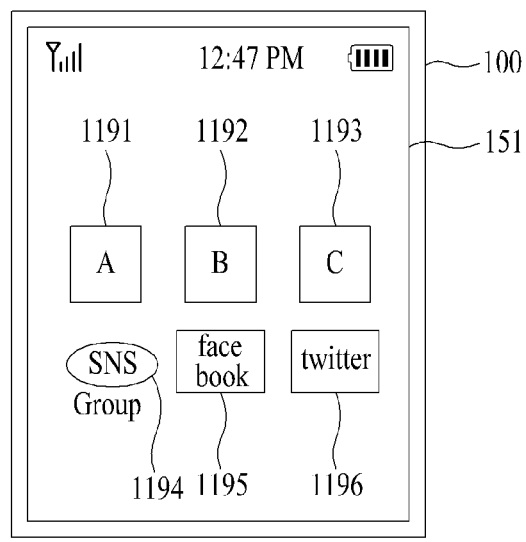

FIG. 11D shows an example of displaying a task group, in which the corresponding task group is represented as an icon.

Referring to FIG. 11D, in case of setting up a task group, an icon is generated in a manner of indicating the corresponding task group by another scheme. The generated icon can be then displayed. In particular, an icon 1194 indicating a task group can be displayed on the display unit 151 together with a plurality of icons 1191, 1192, 1193, 1195 and 1196 respectively indicating different applications.

If the icon 1194 is selected, the controller 180 displays the corresponding tasks or is able to control the corresponding tasks to be executed by a task group operation.

In the following description, a task group operation is explained.

First of all, in case of setting up a task group, the controller 180 is able to execute tasks belonging to the corresponding task group by a task group operation. In the present specification, as mentioned in the foregoing description, the task group operation means that all tasks can be controlled by a single control operation.

For instance, the task group operation is the operation for controlling a plurality of tasks belonging to the task group simultaneously. And, the task group operation can include one of a simultaneous background operation, a simultaneous foreground operation, a simultaneous storage operation, a simultaneous termination operation and the like.

Moreover, a plurality of tasks belonging to a task group can be set in a manner of being correlated to each other. Hence, even if a first task belonging to a task group is executed, a second task belonging to the task group can be executed. Besides, various kinds of controls and informations on the first task belonging to the task group can be set to be shared with the second task belonging to the task group.

FIGS. 12A to 12D are diagrams for one example of an operation for controlling a task by a task group operation according to the present invention.

Figure 12A:
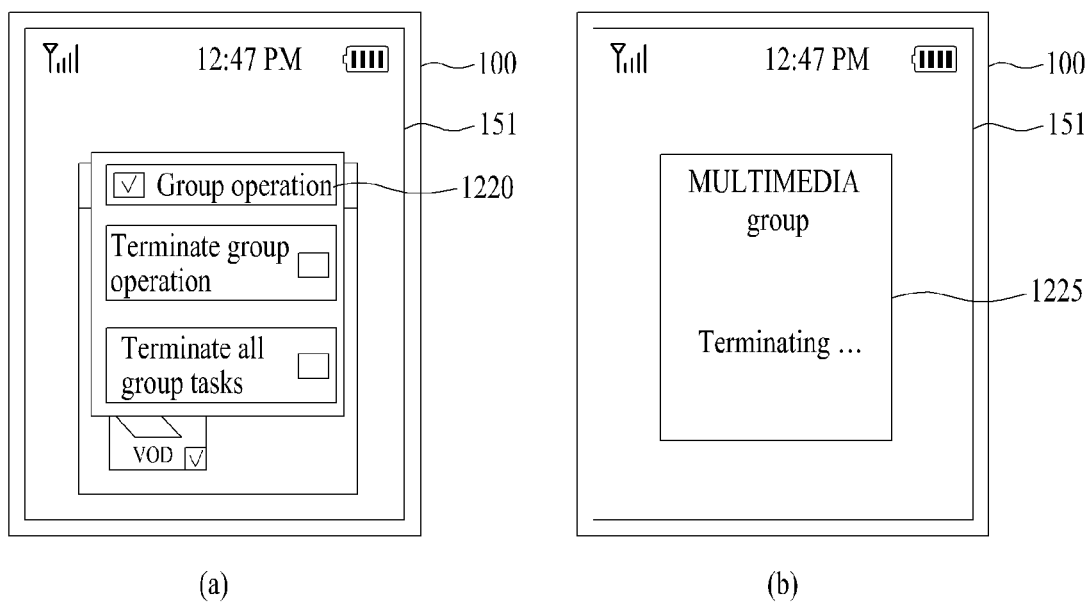
FIGS. 12A to 12D are diagrams for one example of an operation for controlling a task by a task group operation according to the present invention.

FIG. 12A is a diagram for displaying a simultaneous termination of tasks belonging to a task group for one example of a task group operation.

Referring to FIG. 12A (a), a group operation control menu 1220 can be displayed on the display unit 151 in accordance with a selection made by a user. The group operation control menu 1220 includes a menu for terminating a task group operation and a menu for terminating all tasks belonging to a task group. In accordance with a selection of each of the menus, the task group operation is terminated and each of the tasks can be individually executed. Alternatively, all the tasks belonging to the task group can be terminated.

Referring to FIG. 12A (b), the menu for terminating all tasks belonging to the task group is selected. The tasks belonging to the task group are simultaneously controllable by the controller 180. Therefore, referring to the drawing, for example of the task group operation, it is possible to simultaneously terminate all the tasks belonging to the corresponding task group.

Figure 12B:
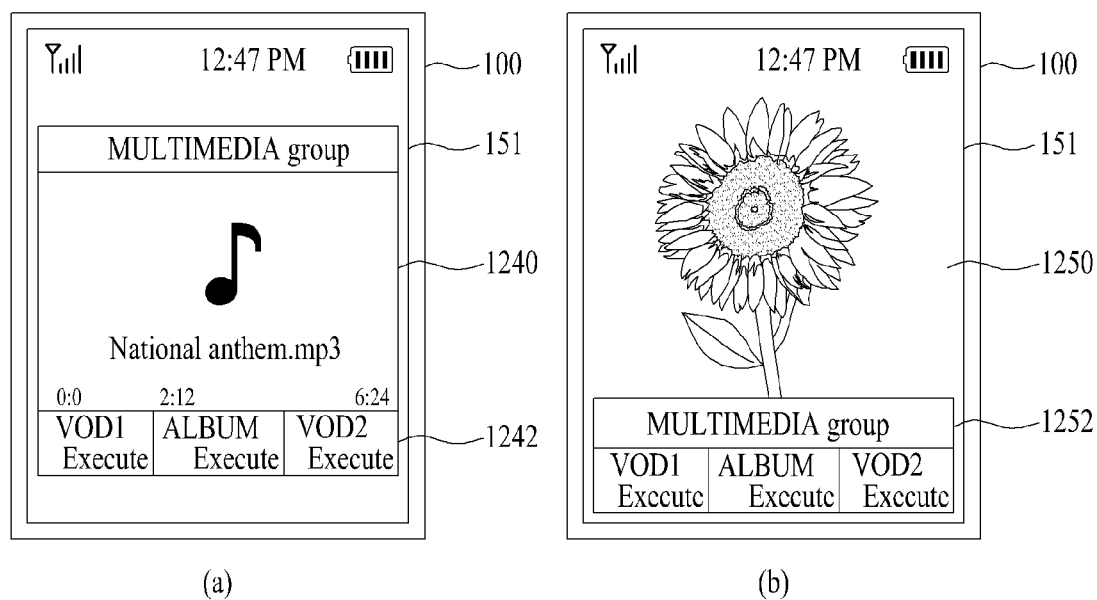

In association with an overall operation of a task group, the present invention is able to control a group operation in accordance with a time. In the course of executing a specific task group by a task group operation, if the corresponding task group is set to a predetermined time (e.g., 10 minutes), the controller 180 is able to simultaneously terminate the corresponding tasks by the task group operation after elapse of the predetermined time. FIG. 12B is a diagram for displaying a background job or a foreground job for example of a task group operation.

In case of execution by a task group operation, all tasks belonging to a corresponding task group are simultaneously executed by multitasking Yet, a user may intend to display a progress status of a specific one of the tasks on a screen. In this case, the corresponding task intended to be displayed on the screen can be named a foreground task. Although the rest of the tasks are being executed as well, their progress statuses are not displayed on the screen. In this case, the rest of the tasks can be named background tasks, respectively.

When a task group operation is performed, various tasks belonging to a task group can be executed in a manner of switching to a background operation or a foreground operation. In particular, a foreground task can be switched from a background task with ease.

Referring to FIG. 12B (a), an MP3 player task working as a foreground task is displayed on a region 1240. And, VOD1, ALBUM and VOD2 tasks working as background tasks are displayed on another region 1242.

Referring to FIG. 12B (b), a background image of the mobile terminal 100 is displayed on a region 1250. And, all tasks belonging to a task group are displayed as working as background tasks. The tasks belonging to the task group are displayed on a region 1252 to indicate that the corresponding tasks are executed by multitasking.

Figure 12C:
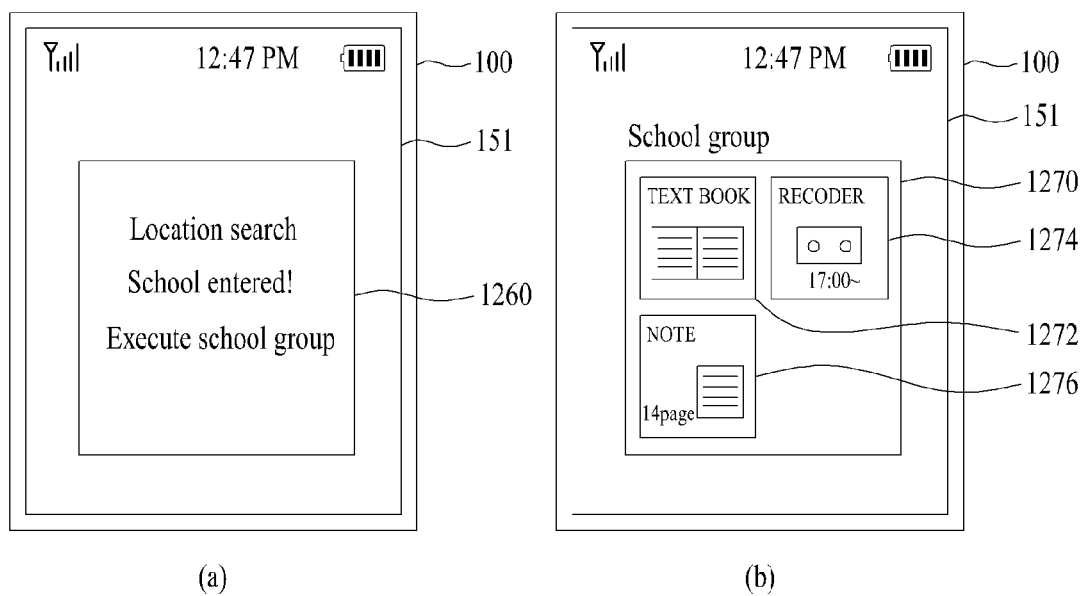

FIG. 12C is a diagram for one example of a task group operation, in which a task group set up in accordance with a location is executed by the task group operation.

As mentioned in the foregoing description with reference to FIG. 8 (d), a task group can be set up in accordance with a place. In this case, the corresponding task group can include a task group associated with a specific place.

Referring to FIG. 12C (a), the display unit 151 is able to announce that a school is entered as a specific location. And, it is able to obtain a current location of the mobile terminal 100 through the position location module 115 of the mobile terminal 100. In particular, if the controller 180 recognizes that a current place is the school through the information provided by the position location module 115, the controller 180 controls the recognized place to be displayed on the display unit 151 and then executes a corresponding or related task group by a task group operation.

Referring to FIG. 12C (b), as the school is entered, the task group related to the school is executed by the task group operation. In the drawing, TEXTBOOK application 1272, RECORDER application 1274 and NOTE application 1276 are displayed as tasks corresponding to the task group related to the school.

The tasks are executed by the task group operation as soon as the school is entered.

Meanwhile, the controller 180 controls the tasks to be simultaneously executed. Alternatively, the controller 180 is able to execute the tasks in a manner of loading each of the tasks from a most-recently terminated point of the corresponding task. For instance, the controller 180 is able to control the NOTE application 1276 to be executed from a specific page of 14. For another instance, the controller 180 is able to control the RECORDER application 1274 to be executed from 17:00.

Figure 12D:
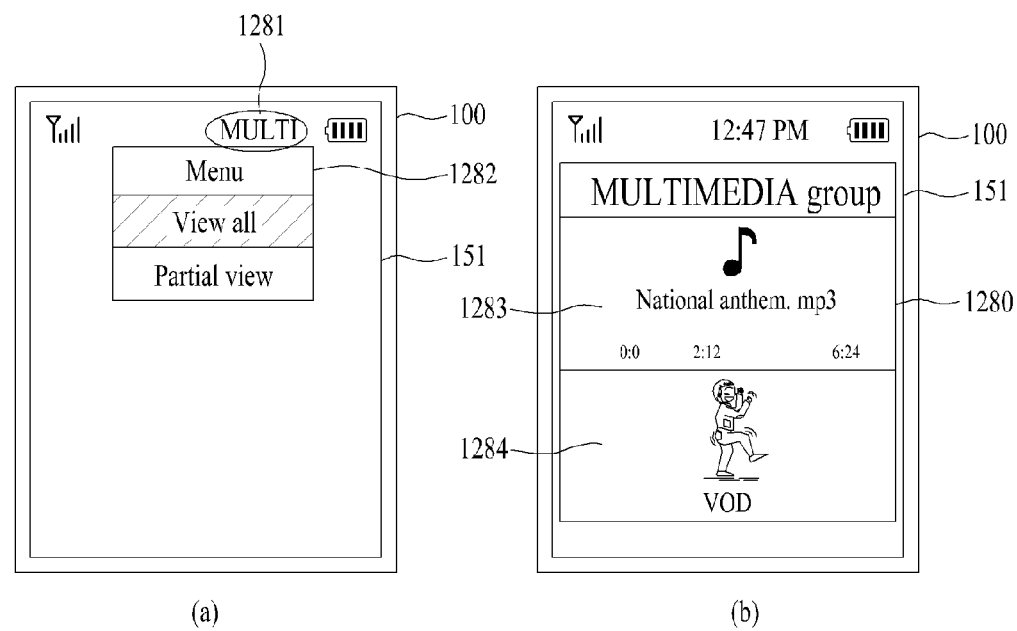
Figure 12D:
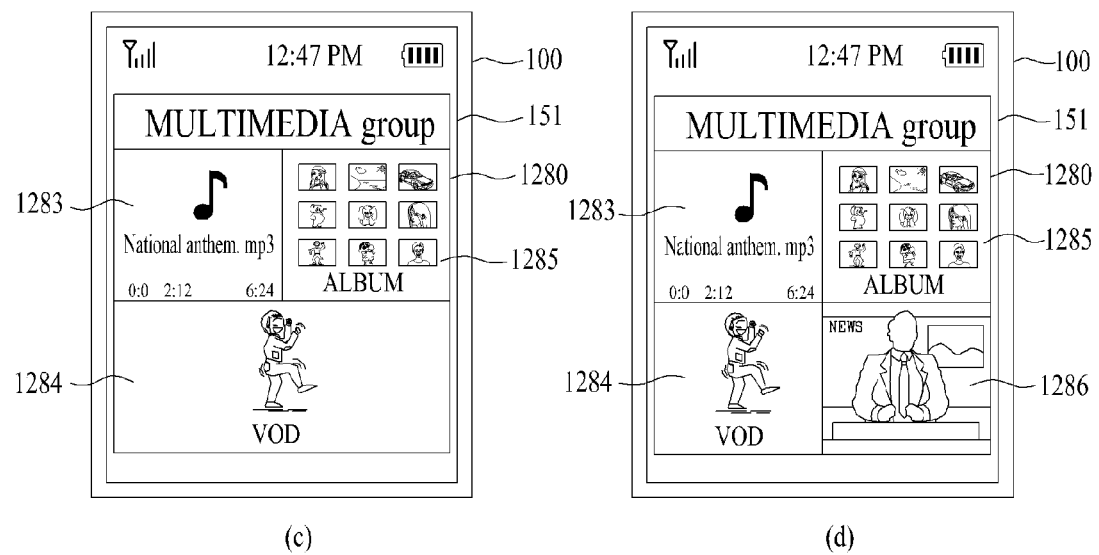

FIG. 12D is a diagram for one example of a task group operation, in which all tasks belonging to a task group are displayed on a single screen.

Referring to FIG. 12D, the present invention is able to provide the display unit 151 with a function of displaying all tasks belonging to a task group.

Referring to FIG. 12D (a), the display unit 151 is able to announce a presence or non-presence of a display function of tasks belonging to a task group via a menu window 1282. If the task group is selected, when tasks belonging to the task group are displayed, it is able to display the tasks belonging to the task group via 'view all' or 'partial view'.

In case of performing a task group operation, the tasks can be displayed in a manner of being correlated to each other. Moreover, since each of the tasks can be executed by multitasking, if the simultaneous execution of the respective tasks is displayed on a single screen, it helps a user to recognize the progress of each of the tasks more clearly.

FIG. 12D (b) is a diagram for displaying the tasks belonging to the task group if a user selected the 'view all' of the task group.

Referring to FIG. 12D (b), MULTIMEDIA group is a task group including two tasks 1283 and 1284. If the 'view all' of the task group is selected, the display unit 151 partitions a display screen into two regions and is then able to display the tasks 1283 and the 1284 on the two regions, respectively. Therefore, the MP3 task 1283 and the VOD task 1284 are displayed on the display unit 151.

FIG. 12D (c) is a diagram for displaying tasks belonging to a task group, in which the task group includes 3 tasks.

Referring to FIG. 12D (c), MULTIMEDIA group is a task group including 3 tasks 1283, 1284 and 1285. If the 'view all' of the task group is selected, the display unit 151 partitions a display screen into 3 regions and is then able to display the MP3 task 1283, the VOD task 1284 and the album task 1285 on the 3 regions, respectively.

FIG. 12D (d) is a diagram for displaying tasks belonging to a task group, in which the task group includes 4 tasks.

Referring to FIG. 12D (d), MULTIMEDIA group is a task group including an MP3 task 1283, a VOD task 1284, an album task 1285 and a TV task 1286. If the 'view all' of the task group is selected, the display unit 151 partitions a display screen into 4 regions and is then able to display the tasks 1283 to 1286 on the 4 regions, respectively.

Figure 13A:
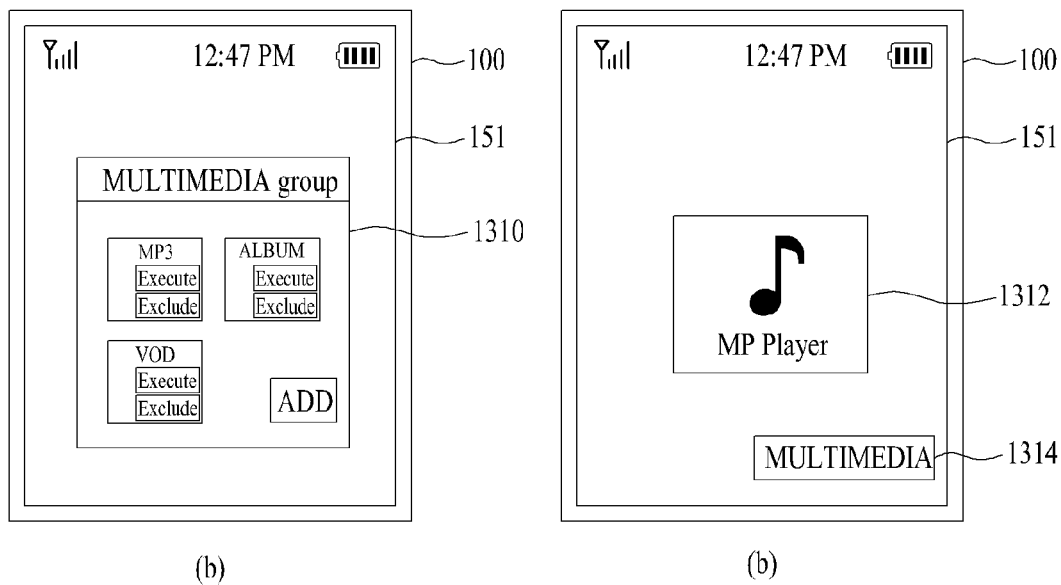
FIGS. 13A to 13C are diagrams for another example of an operation for controlling a task by a task group operation according to the present invention.
Figure 13A:
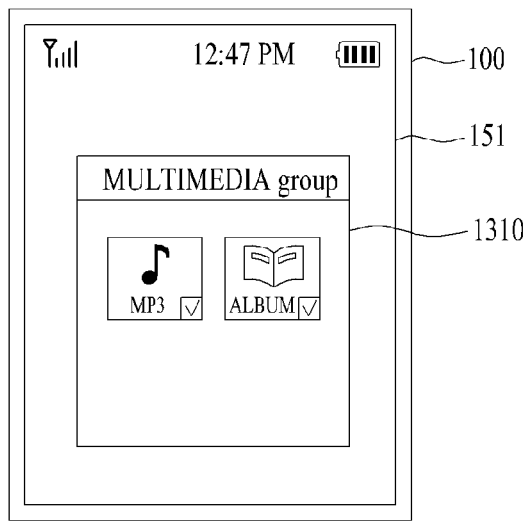
Figure 13B:
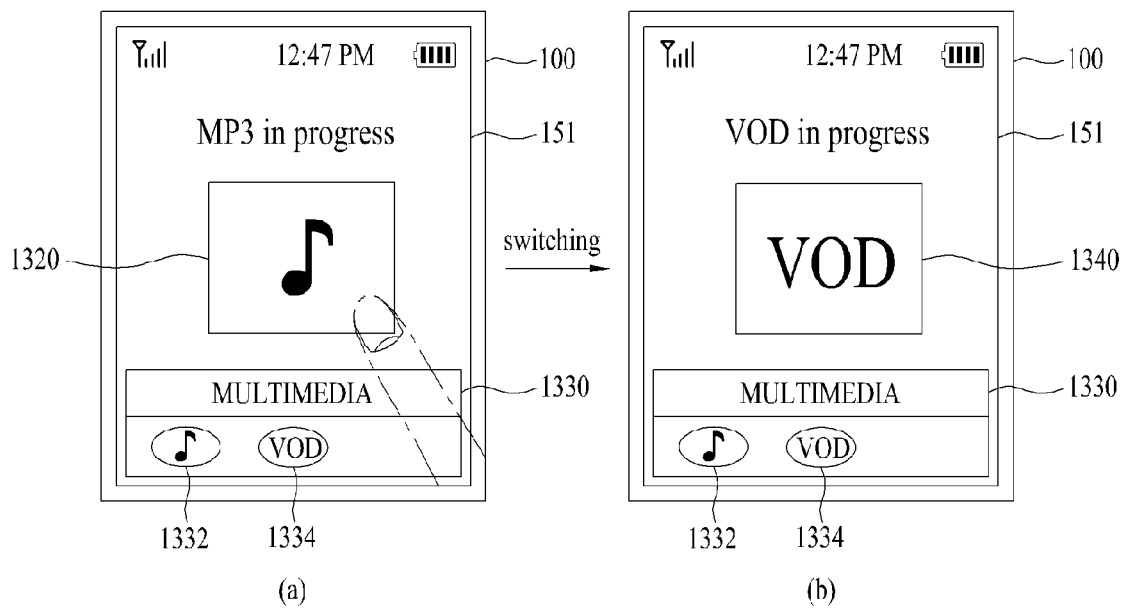
Figure 13C:
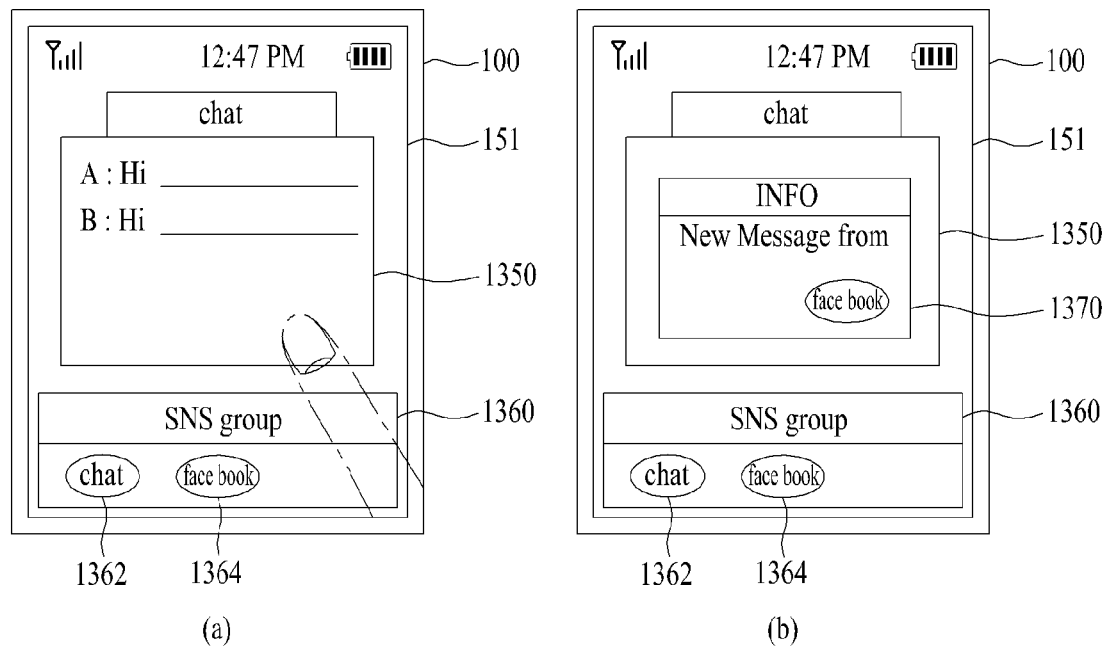

FIGS. 13A to 13C are diagrams for another example of an operation for controlling a task by a task group operation according to the present invention.

FIG. 13A is a diagram for displaying a selection of a specific task belonging to a task group for one example of a task group operation.

Referring to FIG. 13A, a task group can include various kinds of tasks in accordance with a user's setting or a manufacturer's setting. For instance, the tasks can be correlated to each other. Yet, it is not necessary to execute all tasks by a task group operation in every case of execution by the task group operation. Therefore, in each case, it is able to select whether tasks will be executed as a whole.

Referring to FIG. 13A (a), MP3 player, album and VOD tasks belonging to MULTIMEDIA group are displayed on the display unit 151. A menu for selecting 'execute' or 'exclude' is displayed on each of the displayed tasks. Through this menu, it is able to select a separate execution of each of the tasks or an exclusion of each of the tasks from the corresponding task group.

FIG. 13A (b) is a diagram for a case of selecting a prescribed task from a task group in order to execute the selected task.

Referring to FIG. 13A (b), the display unit 151 displays that an MP3 player task 1312 is being executed. And, the display unit 151 also displays a select menu 1314 for selecting whether the corresponding task 1312 will be executed by a group operation again. If the corresponding select menu 1314 is selected, the controller 180 is able to execute the corresponding task by switching the task operation to the task group operation.

FIG. 13A (c) is a diagram for a case of selecting a prescribed task from a task group in order to exclude the corresponding task.

Referring to FIG. 13A (c), it can be observed that the VOD task displayed on the display unit 151 shown in FIG. 13A (a) is excluded from the display unit 151 shown in FIG. 13A (c). This means that the VOD task is excluded in the execution by the task group operation in a manner of excluding the VOD task from the MULTIMEDIA task group.

FIG. 13A (c) shows the case of excluding a specific task belonging to a previous task group from a task group operation before an execution according to the task group operation. On the contrary, after all tasks belonging to a task group have been executed by a task group operation, it is able to exclude a specific task in case of attempting to terminate the tasks by the task group operation. In particular, even if other tasks belonging to the task group are terminated in the course of the execution by the task group operation, the selected specific task can keep being executed.

Thus, in case that tasks belong to a task group, it is possible to perform an individual operation of each of the tasks, an exclusion of a corresponding task from the task group and the like.

The above-described task group operation is just exemplary. And, various kinds of task group operations can be included. Various operations for simultaneously controlling tasks belonging to a specific task group can be included as task group operations. If a case of executing each task individually is more advantageous than a case of executing a task group of tasks as a whole, it can be included in the task group operation.

FIG. 13B is a diagram for a switching operation between tasks belonging to a task group.

Referring to FIG. 13B, tasks belonging to a task group can be set in a manner of being correlated to each other. Hence, tasks failing to belong to a task group and tasks belonging to a group can be connected closely to each other. For instance, the tasks belonging to the task group can be set to have the same letter style, the same size and the like.

And, the tasks belonging to the task group can be set to facilitate an inter-switching operation. For instance, while a first task belonging to a task group is being executed, if a regulated action is inputted by a user, the first task can be switched to a second task belonging to the task group. The action regulated to order a switching can include one of a touch action, a shaking action, a voice command action and the like.

Referring to FIG. 13B (a), an action of executing an MP3 task belonging to a multimedia task group is displayed on the display unit 151. In doing so, in case of receiving an input of a switching command from a user via a touch action, the controller 180 switches the MP3 task to a VOD task belonging to the multimedia task group.

Referring to FIG. 13B (b), the MP3 task 1320 belonging to the multimedia task group is switched to a VOD task 1340 belonging to the same task group in accordance with the switching action.

FIG. 13C is a diagram for an operation of providing an indication menu from one task belonging to a task group in the course of executing another task belonging to the task group.

Referring to FIG. 13C, since tasks belonging to a task group are correlated to each other, although a first task belonging to the task group is being executed, if an announcement message related to a second task belonging to the task group exists, it is able to announce the existence of the announcement message.

FIG. 13C (a) shows an operation of executing a chatting task 1362 belonging to an SNS task group. In this case, if an announcement message from a facebook task 1364 belonging to the SNS task group is checked, the display unit 151 is able to display the checked announcement message 1370 over a display window 1350 for the chatting task 1362, as shown in FIG. 13C (b).

Through this, it is able to set an announcement message to be provided between tasks belonging to a task group only.

Besides, an executing method by a task group operation can include various schemes as follows.

First of all, while a first task is being executed, if a user intends to perform a multitasking operation by executing a second task, the controller 180 determines whether to perform a corresponding task group operation and is then able to load a related task group. Hence, the controller 180 is able to execute the first task and the second task by the task group operation.

Secondly, instead of executing a first task and then executing a second task, there can exist a scheme of performing a task group operation by executing both of the first and second tasks simultaneously.

Thirdly, instead of executing a second task in the course of executing a first task, there can exist a scheme of displaying a plurality of task groups including the first task in the course of executing the first task, selecting a prescribed task group from a plurality of the displayed task groups, and then executing the corresponding task group by a task group operation.

As mentioned in the above description, there can exist various methods of executing tasks by a task group operation. Yet, the present invention is non-limited by the above-described embodiments. And, the present invention is able to further include various schemes pertaining to the scope of the present invention.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following effects and/or advantages.

First of all, a mobile terminal according to at least one embodiment of the present invention controls a plurality of tasks by a group operation including the tasks in case of performing a multitasking instead of controlling each of the tasks individually, thereby facilitating a user to control the tasks.

Secondly, a mobile terminal according to at least one embodiment of the present invention provides a facilitated interface in association with a setting, modification and selection of a task group, thereby facilitating a user to control the task group.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a memory storing at least one task group including two or more tasks;
    a controller performing a task group operation such that at least two of the two or more tasks belonging to the at least one task group are executed simultaneously in response to a single input without requiring separate inputs for executing each of the two or more tasks; and
    a touchscreen display displaying the at least one task group, an execution screen associated with at least one of the executed two or more tasks, and a plurality of task identifiers, each of the plurality of task identifiers representing a corresponding one of the two or more tasks,
    wherein the two or more tasks belonging to the at least one task group are correlated such that a single control operation is simultaneously applied to each of the two or more tasks in response to the single input to execute the two or more tasks simultaneously,
    wherein the task group operation comprises a simultaneous background operation, a simultaneous foreground operation, and a combination of a foreground operation and a background operation, each operation executed independently,
    wherein the simultaneous background operation comprises simultaneous background execution of all tasks in a same task group in response to the single input such that no execution screen associated with the execution of the all tasks is displayed on the touchscreen display,
    wherein the simultaneous foreground operation comprises simultaneous foreground execution of the all tasks in the same task group in response to the single input such that execution screens associated with the execution of the all tasks are displayed together on the touchscreen display, and
    wherein the combination of the background operation and the foreground operation comprises foreground execution of a first task in the same task group and background execution of a second task in the same group that are performed selectively and simultaneously in response to the single input such that a first execution screen associated with the execution of the first task is displayed on the touchscreen display while no execution screen associated with the execution of the second task is displayed.

2. The mobile terminal of claim 1, wherein the controller determines whether to cause displaying of a second execution screen corresponding to the second task being executed in the background while the first task is executed in the foreground and the first execution screen corresponding to the first task is being displayed.

3. The mobile terminal of claim 2, wherein the controller provides a switching option for switching from the first execution screen to the second execution screen while the first task and the second task are executed and the first execution screen is displayed.

4. The mobile terminal of claim 1, wherein the controller excludes at least one specific task of the two or more tasks belonging to the at least one task group from the task group operation when the at least one specific task is selected for exclusion such that the at least one specific task included in the task group is executed independently of the task group operation.

5. The mobile terminal of claim 1, wherein the controller causes the touchscreen display to further display a list of the at least one task group to which specific tasks being executed belongs.

6. The mobile terminal of claim 1, wherein the controller assigns the two or more tasks to the at least one task group according to preset criteria including at least a type of function of the two or more tasks, a use pattern of the two or more tasks, a place where the two or more tasks are used, or priority of the two or more tasks.

7. The mobile terminal of claim 1, further comprising a user input unit receiving a selection of a task to be included in the at least one task group, wherein the selected task is added to the at least one task group.

8. The mobile terminal of claim 7, wherein the user input unit further receives a selection of a directory including at least one task such that the at least one task included in the selected directory is added to the at least one task group.

9. The mobile terminal of claim 1, wherein the memory stores a plurality of task groups and at least two of the plurality of the task groups are combinable into a single specific task group such that the controller simultaneously controls all tasks belonging to the single specific task group by the single control operation when the at least two of the plurality of the task groups are combined into the single specific task group.

10. The mobile terminal of claim 1, wherein the controller causes the touchscreen display to further display the two or more tasks belonging to the at least one task group and a group icon corresponding to the at least one task group.

11. The mobile terminal of claim 10, wherein:
the memory further stores a first task group and a second task group; and
the controller further controls the first task group displayed on the touchscreen display to be switched with the second task group upon receiving a touch input on a group icon corresponding to the first task group such that the second task group is displayed on the touchscreen display in response to the touch input.

12. The mobile terminal of claim 1, wherein the controller further controls the touchscreen display to be partitioned into two or more execution screens according to a number of the two or more tasks belonging to the at least one task group such that the touchscreen display further displays each of the two or more tasks being executed by the task group operation on a corresponding one of the two or more execution screens.

13. The mobile terminal of claim 1, wherein the controller causes the touchscreen display to further display an indicator indicating a number of the two or more tasks belonging to the at least one task group that are executed by performing the task group operation.

14. The mobile terminal of claim 1, wherein:
the at least one task group comprises a first task group and a second task group; and
a same task is included in both the first task group and the second task group.

15. The mobile terminal of claim 1, wherein the controller further:
recognizes a designated event associated with the at least one task group; and
executes the two or more tasks simultaneously by performing the task group operation in response to the recognized designated event.

16. The mobile terminal of claim 15, wherein recognizing the designated event comprises determining a current location of the mobile terminal and determining that the current location corresponds to a specific location.

17. A method of controlling a group operation in a mobile terminal, the method comprising:
assigning two or more tasks to a task group;
storing the task group including the two or more tasks;
performing a task group operation such that the two or more tasks belonging to the task group are executed simultaneously in response to a single input without requiring separate inputs for executing each of the two or more tasks; and
displaying the task group, an execution screen associated with at least one of the executed two or more tasks, and a plurality of task identifiers, each of the plurality of task identifiers representing a corresponding one of the two or more tasks,
wherein the two or more tasks belonging to the task group are correlated such that a single control operation is simultaneously applied to each of the two or more tasks in response to the single input to execute the two or more tasks simultaneously,
wherein the task group operation comprises a simultaneous background operation, a simultaneous foreground operation, and a combination of a foreground operation and a background operation, each operation executed independently,
wherein the simultaneous background operation comprises simultaneous background execution of all tasks in a same task group in response to the single input such that no execution screen associated with the execution of the all tasks is displayed on the touchscreen display,
wherein the simultaneous foreground operation comprises simultaneous foreground execution of the all tasks in the same task group in response to the single input such that execution screens associated with the execution of the all tasks are displayed together on the touchscreen display, and
wherein the combination of the background operation and the foreground operation comprises foreground execution of a first task in the same task group and background execution of a second task in the same task group that are performed selectively and simultaneously in response to the single input such that a first execution screen associated with the execution of the first task is displayed on the touchscreen display while no execution screen associated with the execution of the second task is displayed.

18. The method of claim 17, further comprising simultaneously terminating the execution of the two or more tasks belonging to the task group in response to a single input generating a signal for termination of the two or more tasks belonging to the task group.

19. The method of claim 17, further comprising displaying the two or more tasks belonging to the task group and a group icon corresponding to the task group on a display of the mobile terminal.

20. The method of claim 17, further comprising displaying an indicator indicating a number of the two or more tasks belonging to the task group that are executed by performing the task group operation.

* * * * *